United States Patent [19]

Togino

[11] Patent Number: 5,436,765
[45] Date of Patent: Jul. 25, 1995

[54] VISUAL DISPLAY APPARATUS

[75] Inventor: Takayoshi Togino, Tokyo, Japan

[73] Assignee: Olympus Optical Co., Ltd., Tokyo, Japan

[21] Appl. No.: 95,514

[22] Filed: Jul. 26, 1993

[30] Foreign Application Priority Data

Jul. 27, 1992 [JP] Japan .................... 4-199487

[51] Int. Cl.⁶ ........................... G02B 27/14
[52] U.S. Cl. .................. 359/631; 359/434; 359/630
[58] Field of Search ........... 359/631, 630, 629, 727, 359/728, 432–435

[56] References Cited

U.S. PATENT DOCUMENTS

| | | |
|---|---|---|
| 4,026,641 | 5/1977 | Bosserman et al. . |
| 4,218,111 | 8/1980 | Withrington et al. ........... 359/630 |
| 4,669,810 | 6/1987 | Wood . |
| 4,729,634 | 3/1988 | Raber ........... 359/630 |
| 4,997,263 | 3/1991 | Cohen et al. . |

FOREIGN PATENT DOCUMENTS

| | | |
|---|---|---|
| 7039 | 1/1980 | European Pat. Off. ........... 359/630 |
| 5-134208 | 5/1993 | Japan . |
| 5-304054 | 11/1993 | Japan . |

OTHER PUBLICATIONS

Yano, Sunio: "Psychological Effects of Visual Angle for Stereoscopic Images", vol. 45, No. 12 (1991) pp. 1589–1596.

Primary Examiner—Loha Ben
Assistant Examiner—Thong Nguyen
Attorney, Agent, or Firm—Cushman, Darby & Cushman

[57] ABSTRACT

A head- or face-mounted display apparatus which enables observation at a field angle of 40° or more and provides an image which is flat and clear as far as the peripheries thereof. The display apparatus has a two-dimensional image display element (1), a relay optical system (2 and 3) for projecting a two-dimensional image displayed by the two-dimensional image display element (1), and a concaves mirror (4) disposed forwardly of an observer's eyeball (5) to project the two-dimensional image in the air as an enlarged image and to lead the projected image to the observer's eyeball (5). The relay optical system includes a first lens unit (2) including at least one positive lens and having positive or negative refracting power, and a second lens unit (3) including at least one negative lens and having negative refracting power. The relay optical system is decentered so that the front focal surface (8) of the concave mirror (4) coincides with the image surface (7) of the relay optical system.

11 Claims, 24 Drawing Sheets (Y-axis direction)      (X-axis direction)
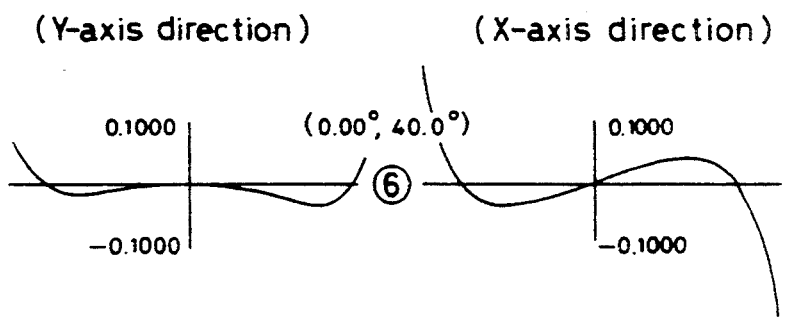
FIG. 13(a) — (0.00°, 40.0°) ⑥
FIG. 13(b) — (40.0°, 40.0°) ⑤
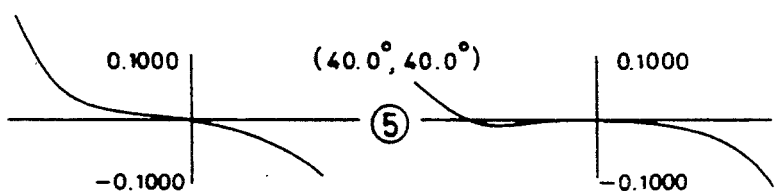
FIG. 13(c) — (40.0°, 0.00°) ④
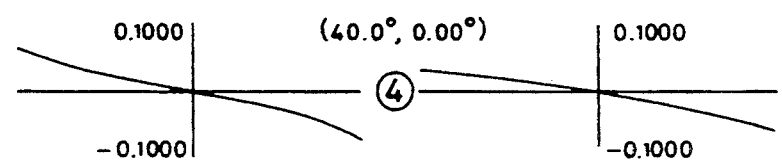
FIG. 13(d) — (40.0°, −60.0°) ③
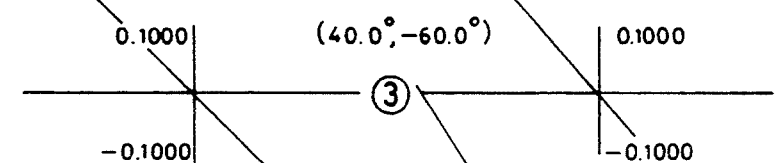
FIG. 13(e) — (0.00°, −60.0°) ②
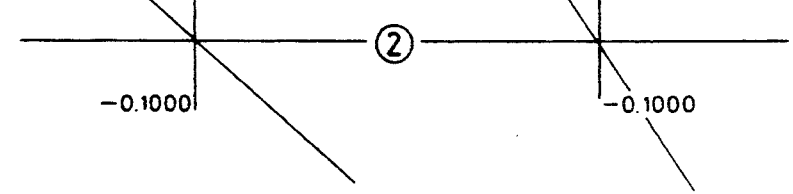
FIG. 13(f) — (0.00°, 0.00°) ①
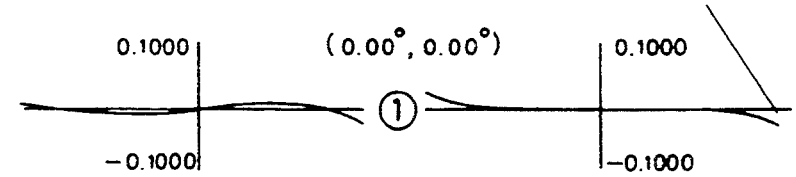

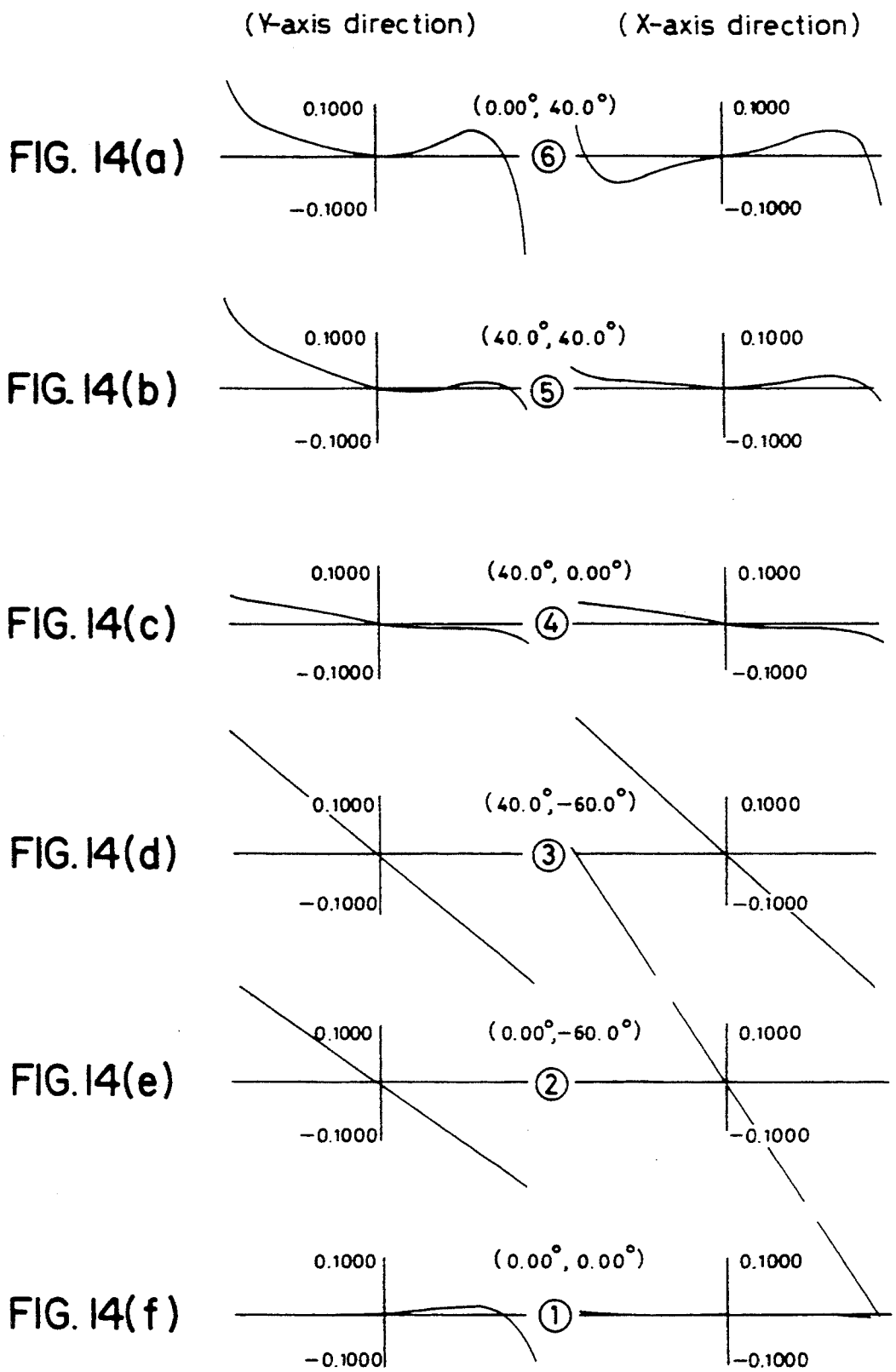

(Y-axis direction) (X-axis direction)

(Y-axis direction) (X-axis direction)

(Y-axis direction) (X-axis direction)

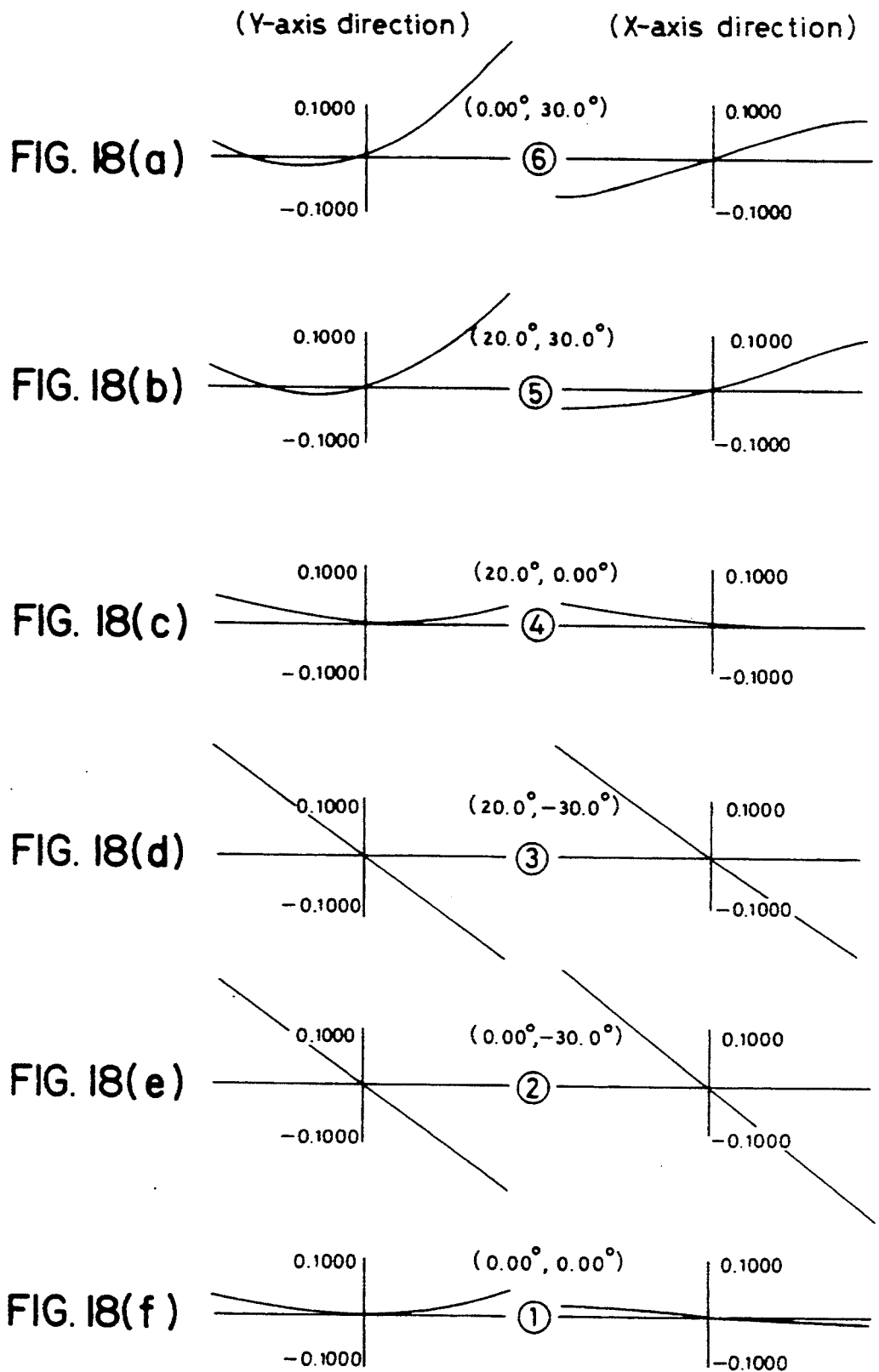

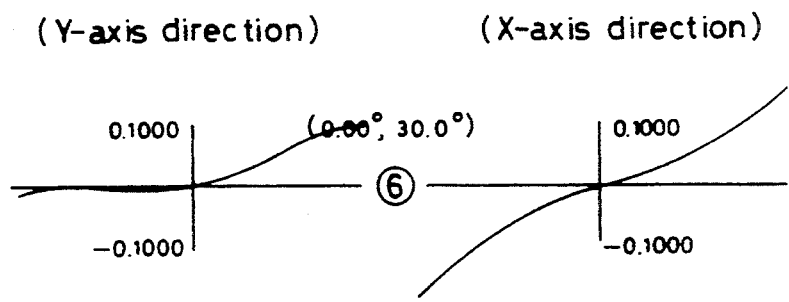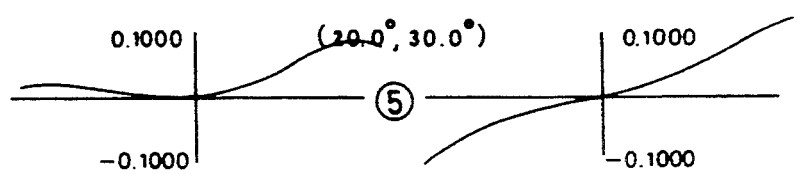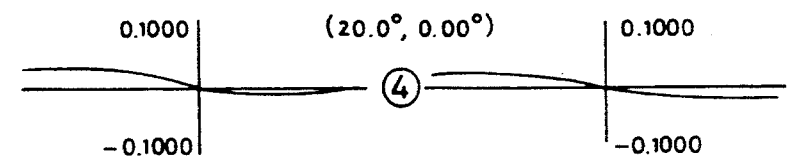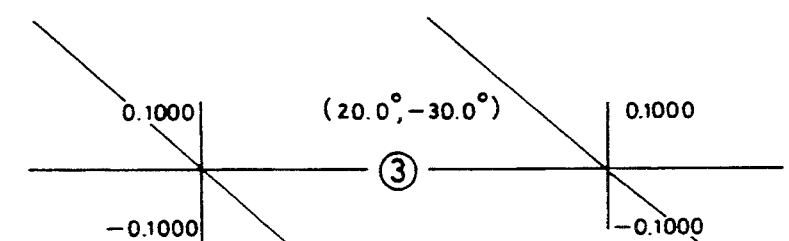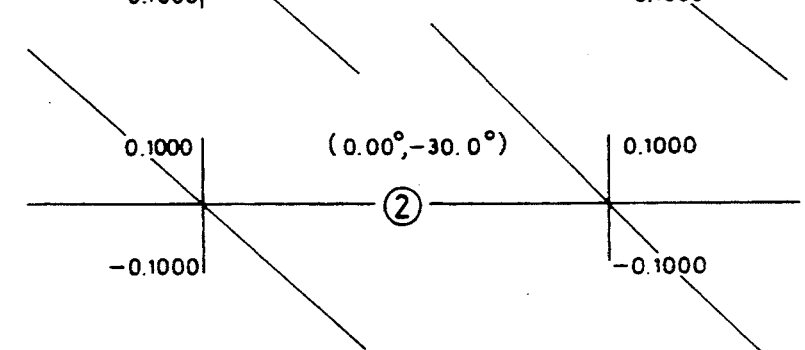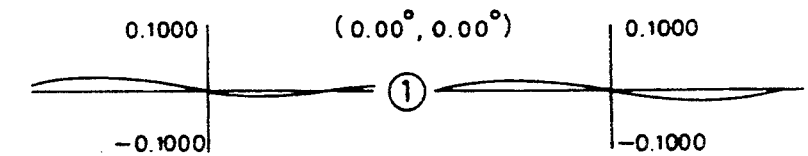

(Y-axis direction) (X-axis direction)

(Y-axis direction)   (X-axis direction)

VISUAL DISPLAY APPARATUS

BACKGROUND OF THE INVENTION

The present invention relates to a portable visual display apparatus and, more particularly, to a head- or face-mounted display apparatus that can be retained on the observer's head or face.

A head-mounted display apparatus such as that shown in the plan view of FIG. 23 has heretofore been known (see U.S. Pat. No. 4,026,641). In the conventional head-mounted display apparatus, an image of an image display element 46, e.g., a CRT, is transferred to an object surface 12 by an image transfer device 25, and the image transferred to the object surface 12 is projected in the air by a toric reflector 10.

Another related art is disclosed in FIG. 9 of Japanese Patent Application No. 3-295874 (laid open on May 28, 1993 under publication No. 5-134208) by the present applicant. As shown in FIG. 24, the conventional display apparatus employs an ocular optical system 22 including a positive lens system for projecting an image of a two-dimensional image display element 21 in the air as an enlarged image, thereby projecting the image of the two-dimensional image display element 21 onto an observer's eyeball 23 as an enlarged image by the action of the positive lens system 22 only.

Incidentally, the conventional technique shown in FIG. 24 has an advantage in that the optical system needed therefor is simple in arrangement. However, it suffers from the problems that the amount to which the two-dimensional image display element 21 projects from the observer's head is disadvantageously large, and that it is not easy to switch over the outside world image and the observation image from one to the other, and further that if it is intended to ensure a wide field angle, the size of the positive lens system 22 increases, and thus the display apparatus increases in the overall size, making the observer feel uncomfortable when wearing it.

The problems to be solved by the present invention will be explained below more specifically.

For a head-mounted display apparatus, it is important to minimize the overall size thereof in order to make the observer feel comfortable when wearing it. Essential factors in determining the feeling given to the observer when wearing the display apparatus are the weight and center of gravity of the apparatus, and these factors are determined by the layout of the optical system. In the case of a direct-vision layout as shown in FIG. 24, the amount to which the apparatus projects from the observer's face is unfavorably large. Accordingly, the apparatus is heavy in weight, and the balance of weight is unfavorable. That is, the forward end of the observer's head is heavy, so that the observer cannot see forward unless he or she makes efforts to lift up his/her head at all times. Accordingly, the apparatus causes the observer to have a stiff neck.

To enable the observer to use the apparatus for a long time without fatigue, it is preferable to adopt an arrangement in which an ocular optical system including a reflecting surface, is disposed immediately in front of the observer's eyeball. With this arrangement, a two-dimensional image display element, an illuminating optical system, etc. can be disposed closer to the center of the observer's head. Accordingly, the center of gravity of the apparatus can be placed relatively close to the center of gravity of the observer's head.

Next, it is necessary to ensure a wide field angle in order to enhance the feeling of being at the actual spot which is given to the observer when viewing the displayed image. In particular, the stereoscopic effect of the image presented is determined by the field angle at which the image is presented (see The Journal of the Institute of Television Engineers of Japan Vol. 45, No. 12, pp. 1589-1596 (1991)). It is known that it is necessary in order to present a stereoscopic and powerful image to the observer to ensure a presentation field angle of 40° (±20°) or more in the horizontal direction, and that the stereoscopic and other effects are saturated in the vicinity of 120° (±60°). In other words, it is preferable to select a field angle which is not smaller than 40° and which is as close to 120° as possible. However, in a case where the above-described ocular optical system is a plane reflecting mirror, it is necessary to use an extraordinarily large two-dimensional image display element in order to make light rays incident on the observer's eyeball at a field angle of 40° or more. After all, the apparatus increases in both the overall size and overall weight. The same problem arises in the arrangement wherein a concave mirror is used, and a two-dimensional image display element is disposed at the front focal point of the concave mirror, thereby projecting an image of the two-dimensional image display element in the air as an enlarged image by the concave mirror alone, as in the prior art shown in FIG. 23. That is, if a field angle of 40° or more is provided in the above-described arrangement, rays of light emerging from the two-dimensional image display element strike on the observer's head. Therefore, it is impossible to realize the desired arrangement.

SUMMARY OF THE INVENTION

In view of the above-described problems of the related art, it is an object of the present invention to provide a visual display apparatus which enables observation at a field angle of 40° or more and provides an image which is flat and clear as far as the peripheries thereof.

To attain the above-described object, the present invention provides a head- or face-mounted display apparatus having a screen device for displaying an image, a relay optical system for relaying the image displayed by the screen device, and an ocular optical system disposed in front of an observer's eyeball to lead an optical path from the relay optical system to the observer's eyeball so that the image relayed by the relay optical system is projected inside the observer's eyeball as an enlarged image. The relay optical system includes a first lens unit having at least one positive lens and having positive power as a whole, and a second lens unit having negative power. The first and second lens units are disposed in series in the mentioned order from the screen device side. The relay optical system is disposed so that the lens center axis of at least the second lens unit is decentered with respect to the visual axis that is led from the ocular optical system to the screen device when the observer sees forward.

The reason for adopting the above-described arrangement and the function thereof will be explained below.

FIG. 1 is a view showing only an optical system of the visual display apparatus of the present invention for the observer's right eye e. An optical system for the observer's left eye is disposed in symmetrical relation to the one illustrated in the figure. In FIG. 1, reference numeral 1 denotes a two-dimensional image display element, 2 a first lens unit of a relay optical system, and 3 a second lens unit of the relay optical system. An image displayed by the two-dimensional image display element 1 is relayed by the first and second lens units 2 and 3 of the relay optical system and projected in the air as an enlarged image by an ocular optical system 4. Reference numeral 5 denotes the position of the observer's eye, and reference numeral 6 denotes the observer's visual axis lying when he or she sees forward. Reference numeral 7 denotes an image surface of the relay optical system (2 and 3) with respect to object points in an arrangement wherein decentering is not made. Further, reference numeral 8 denotes a front focal surface of the ocular optical system 4, 9 the center axis of the relay optical system (2 and 3), and 11 the observer's head.

As has been described above, a wide-field angle ocular optical system having a field angle exceeding 40° cannot be realized with such an arrangement as that disclosed in Japanese Patent Application No. 4-106911, which has previously been filed by the present applicant, and published Nov. 16, 1993 under No. 5-303054, even if the ocular optical system is formed from an aspherical surface. It is necessary, in order to obtain a small-sized visual display apparatus which provides a flat observation image and in which the amount to which the whole apparatus projects from the observer's head is small, to dispose in front of the observer's face an ocular optical system including a concave mirror given a tilt with respect to the visual axis of the observer. It is important that the image of the two-dimensional image display element which is projected by the relay optical system should lie in the vicinity of the front focal surface of the ocular optical system formed from a concave reflecting mirror.

However, if the image of the two-dimensional image display element projected by the relay optical system is merely placed at the position of the front focal point of the relay optical system, the amount to which the relay optical system (2 and 3) projects from one side of the observer's head increases undesirably, as shown in FIG. 2. Therefore, it is necessary to deviate the visual axis before it enters the ocular optical system 4. The following methods are available for deviation of the visual axis:

(1) A method in which a prism is disposed to deviate the visual axis (the method of the second embodiment in Japanese Patent Application No. 3-295874).

(2) A method that employs a lens system including a positive leans disposed in a decentered position, as shown in FIG. 3(*a*) (the method of the third embodiment in Japanese Patent Application No. 3-295874).

(3) A method that employs a lens system including a negative lens disposed in a decentered position, as shown in FIG. 3 (*b*).

However, if it is intended to project an image by using a positive relay lens system having a short focal length as in the present invention, the Petzval sum of the relay lens system becomes large in the positive direction due to the strong positive refracting power, resulting in a strong curvature of field. Neither a prism nor a positive lens disposed in a decentered position is effective in correcting the Petzval sum of the relay optical system. To the contrary, a positive lens disposed in a decentered position further increases the large positive Petzval sum. If the image of the two-dimensional image display element 1 is projected in the vicinity of the front focal surface of the ocular optical system 4 with an arrangement such as that described above, it is impossible to view a flat image at a wide field angle. It is essential in order to correct the large positive Petzval sum to dispose a negative lens in the vicinity of the image surface of the relay lens system. Since the negative lens has a negative Petzval sum, it brings about a favorable result for correction of the overall Petzval sum of the lens system.

According to the present invention, the observer's visual axis 6 is deviated along the observer's head by using a negative decentered lens, as shown in FIG. 3(*b*). Thus, we have succeeded in providing a visual display apparatus which projects only a little from the observer's head and which is small in size and ensures a wide field angle.

It is preferable to dispose the relay optical system (2 and 3) at a tilt so that the visual axis 6 coincides with an off-axis portion of the image surface 7 perpendicular to the optical axis 9 of the relay optical system (2 and 3) in order to allow the image projected by the relay optical system (2 and 3) to coincide with the front focal surface of the ocular optical system 4 given a tilt with respect to the visual axis 6.

In other words, the relay optical system (2 and 3) is tilted by θ in the clockwise direction as viewed in FIG. 1 so that the visual axis 6 coincides with an off-axis object point of the relay optical system (2 and 3). Consequently, the front focal surface 8 of the ocular optical system 4 and the image surface 7 of the relay optical system (2 and 3) coincide with each other. This arrangement brings about a favorable effect for obtaining a wide field angle.

It is even more preferable to dispose the two-dimensional image display element 1 at a tilt with respect to the optical axis 9 of the relay optical system (2 and 3) so that the tilt of the front focal surface 8 of the ocular optical system 4 with respect to the visual axis 6 is matched better with the tilt of the image 7 of the two-dimensional image display element 1 projected by the relay optical system (2 and 3). By doing so, it becomes possible to make even more effective aberration correction over a wide field angle.

It is even more preferable to satisfy the following conditional expression:

$$|F_2| < 100 \text{ millimeters} \qquad (1)$$

where $F_2$ is the focal length of the second lens unit 3 in the relay optical system and mm is millimeters.

If the focal length $F_2$ exceeds the upper limit defined by the above conditional expression (1), the correction of the Petzval sum of the relay optical system (2 and 3) is insufficient, so that it is impossible to obtain a flat image surface with respect to the optical axis 9 of the relay optical system (2 and 3). Accordingly, even if the relay optical system (2 and 3) is disposed at a tilt, it is impossible to provide an observation image having the aberrations satisfactorily corrected over the whole field angle.

With the achievement of high-resolution images in recent years, the resolution of two-dimensional image display elements has also become high. Therefore, it is even more preferable to satisfy the following conditional expression (2):

$$|F_2| < 70 \text{ millimeters} \quad (2)$$

If the focal length $F_2$ exceeds the upper limit defined by the above conditional expression (2), an image of high resolution may be affected by degradation due to aberrations, although the image formed by the two-dimensional image display element 1 can usually be observed without any problem as long as the focal length $F_2$ is within the range defined by the conditional expression (1). Therefore, a focal length $F_2$ in excess of the upper limit defined by the conditional expression (2) is not preferable.

Further, it is preferable to satisfy the following conditional expression:

$$|F_1| < 50 \text{ millimeters} \quad (3)$$

where $F_1$ is the focal length of the first lens unit 2 in the relay optical system.

If the focal length $F_1$ exceeds the upper limit defined by the above conditional expression (3), the overall length of the relay optical system (2 and 3) increases, resulting in an increase in the overall size of the apparatus.

In addition, if the observer's pupil 5 is disposed at a position remote from the back focal point of the ocular optical system 4, rays of light for projecting the image of the two-dimensional image display element 1 enter the concave mirror 4 after diverging correspondingly. Accordingly, the relay optical system (2 and 3) can be reduced in size.

If it is desired to realize a more compact structure, it is preferable to satisfy the following conditional expression (4):

$$|F_1| < 40 \text{ millimeters} \quad (4)$$

It is even more preferable to satisfy the following conditional expressions (5) and (6):

$$D > 1.2 \times FR \quad (5)$$

$$D > 30 \text{ millimeters} \quad (6)$$

where FR is the focal length of the ocular optical system 4, and D is the distance from the ocular optical system 4 to the observer's iris or eyeball rolling position 5.

If the distance D is shorter than the lower limit defined by the conditional expression (5), the exit pupil of the relay optical system (2 and 3) cannot be projected at the position of the observer's iris 5 unless the exit pupil is disposed on the side of the projected image of the two-dimensional image display element 1 which is closer to the ocular optical system 4. Accordingly, the relay optical system (2 and 3) increases in size, resulting in an increase in the overall size of the apparatus.

Further, if the distance D between the ocular optical system 4 and the observer's iris or eyeball rolling position 5 is excessively short, since the ocular optical system 4 is disposed immediately in front of the observer's eyeball, it may be touched by the observer's eyelashes or terrify the observer. Therefore, it is desirable to dispose the ocular optical system 4 so that the distance D between the same and the observer's iris or eyeball rolling position 5 is longer than 30 min. That is, it is preferable to satisfy the conditional expression (6).

It should be noted that the above conditional expressions (1) to (6) are constituent elements required to enhance the advantageous effects of the present invention, which have been described above. In addition, the following combinations of the conditional expressions may also be essential as constituent elements according to the required effectiveness:

$$|F_2| < 100 \text{ millimeters} \quad (1)$$

$$|F_1| < 50 \text{ millimeters} \quad (3)$$

$$|F_2| < 100 \text{ millimeters} \quad (1)$$

$$D > 1.2 \times FR \quad (5)$$

$$D > 30 \text{ millimeters} \quad (6)$$

$$|F_1| < 50 \text{ millimeters} \quad (3)$$

$$D > 1.2 \times FR \quad (5)$$

$$D > 30 \text{ millimeters} \quad (6)$$

It should be noted that the visual display apparatus of the present invention, when used as a head-mounted display apparatus (HMD) 12, is mounted on the observer's head with a head band 13, for example, attached to the apparatus, as shown in the sectional view of FIG. 22(a) and in the perspective view of FIG. 22(b).

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 13(a) tp 13(f) graphically show lateral aberrations at D line in the embodiment 1.

FIGS. 14(a) to 14(f) graphically show lateral aberrations in the embodiment 2 in the same way as in FIG. 13.

FIGS. 18(a) to 18(f) graphically show lateral aberrations in the embodiment 6 in the same way as in FIG. 13.

FIGS. 19(a) to 19(f) graphically show lateral aberrations in the embodiment 7 in the same way as in FIG. 13.

FIGS. 20(a) to 20(f) graphically show lateral aberrations in the embodiment 8 in the same way as in FIG. 13.

DESCRIPTION OF THE PREFERRED EMBODIMENTS

Embodiments 1 to 9 of the visual display apparatus according to the present invention will be described below.

Embodiment 1

Figure 1:
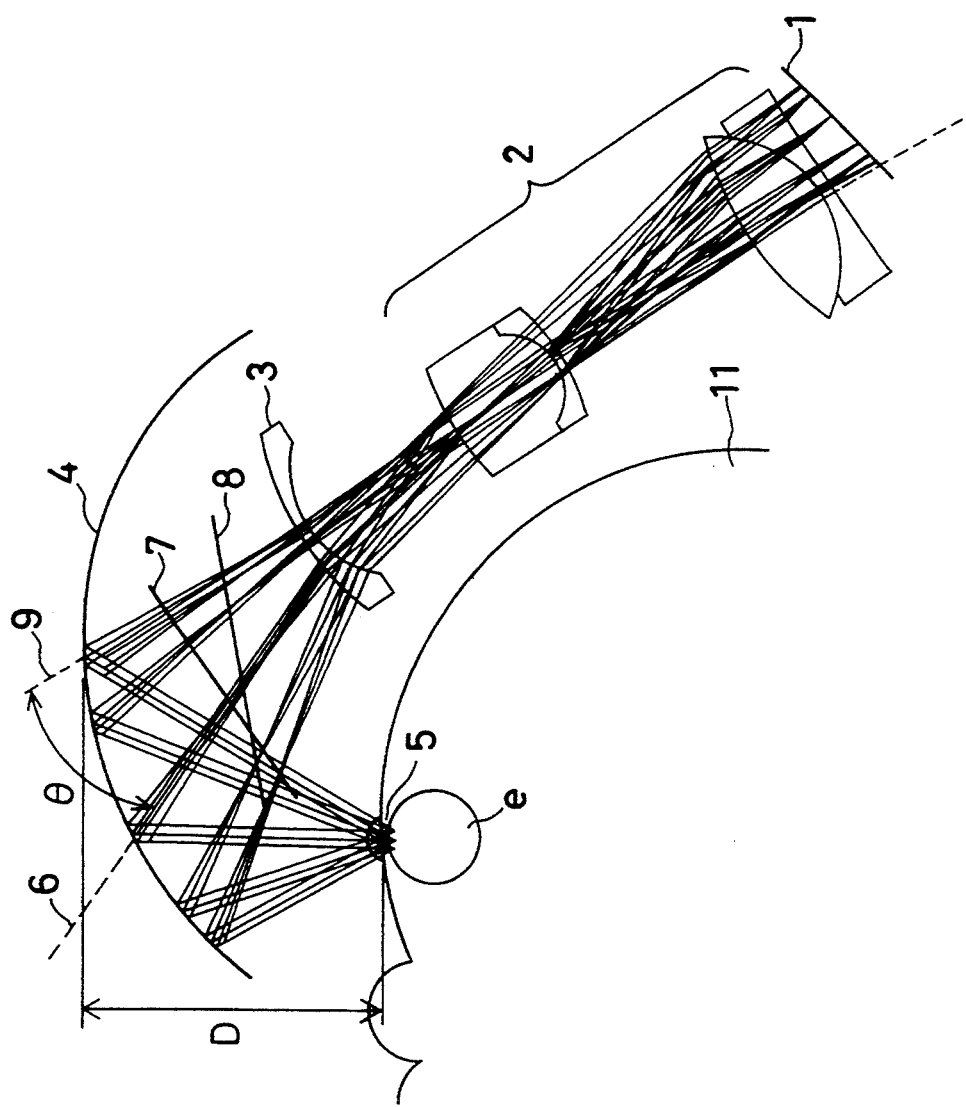
FIG. 1 shows an optical system of the visual display apparatus according to the present invention.
Figure 2:
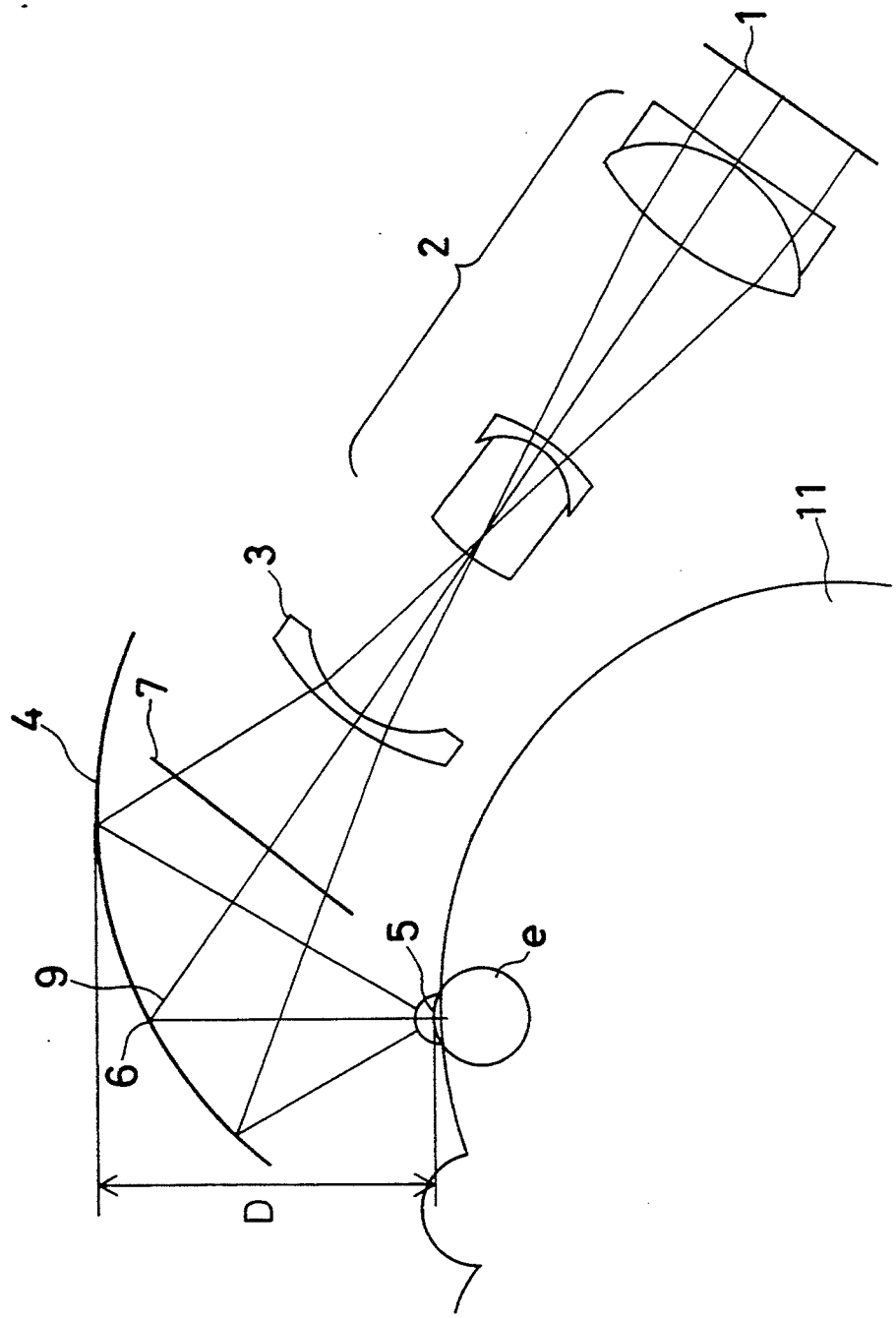
FIG. 2 is a view for explanation of the visual display apparatus according to the present invention.
Figure 3A:
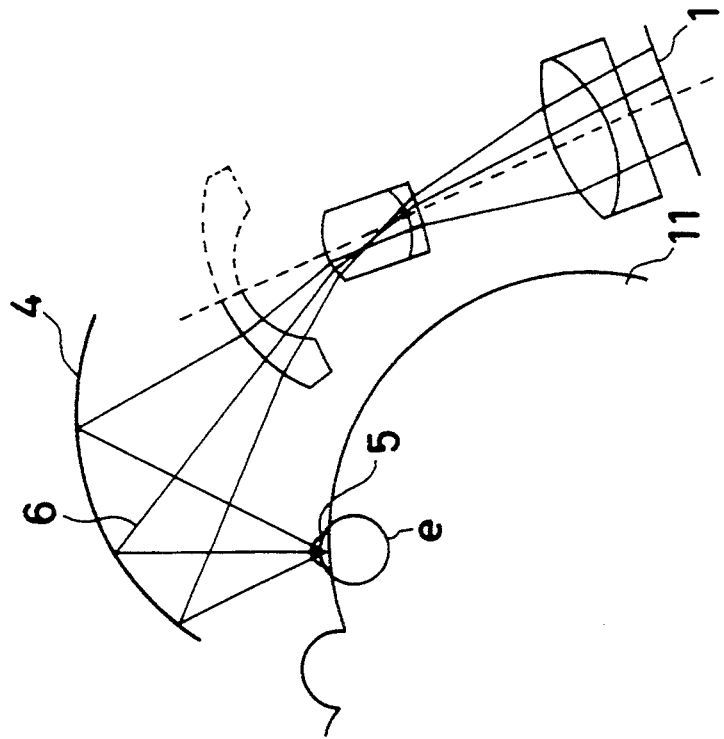
FIG. 3(a) and 3(b) are views for explanation of a method of deviating the visual axis.
Figure 3B:
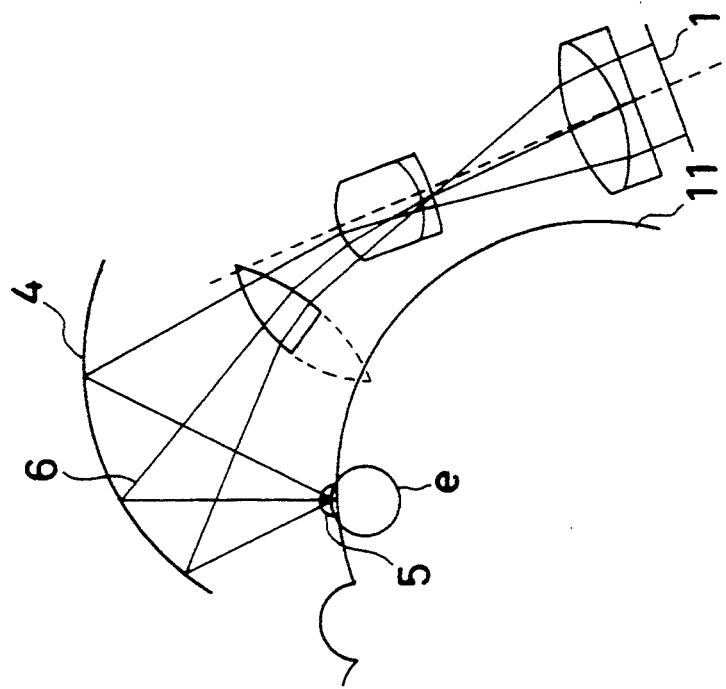
Figure 4:
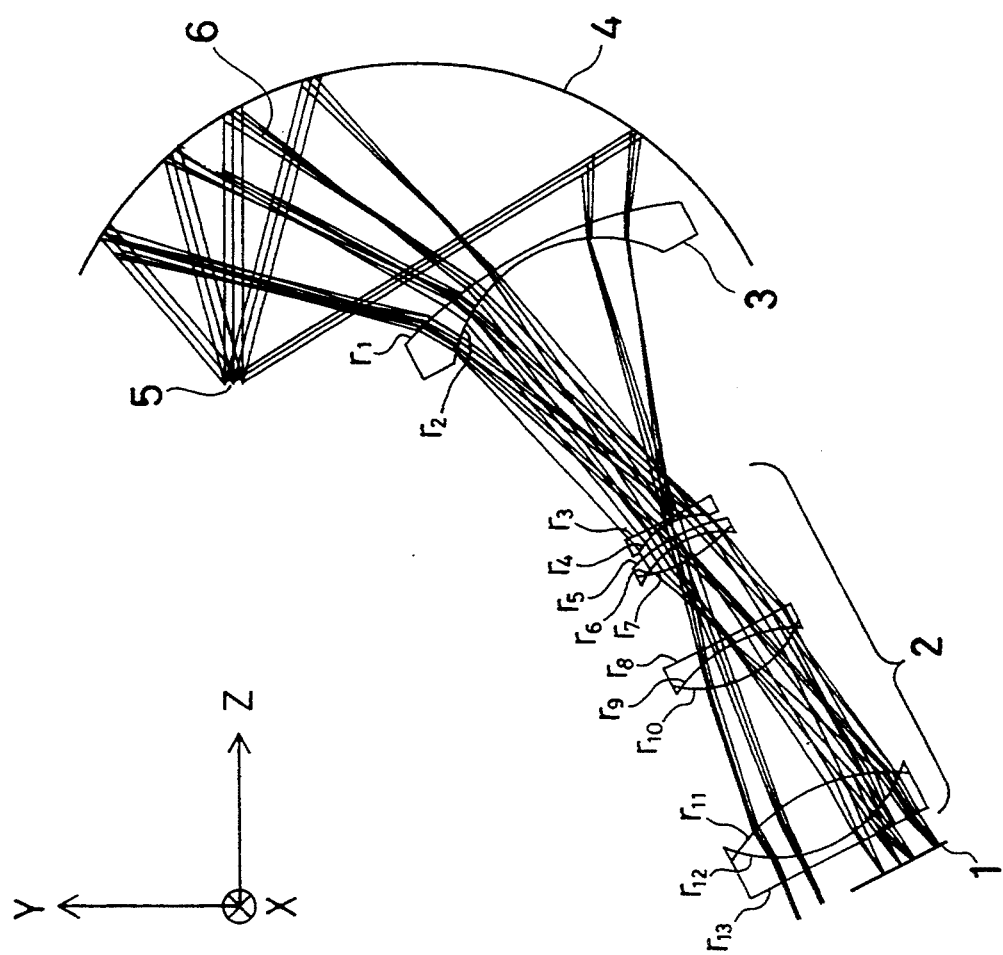
FIG. 4 shows the optical arrangement of embodiment 1 of the present invention.

The embodiment 1 will be explained with reference to FIG. 4. A coordinate system is defined as illustrated in the figure. That is, the sideward (horizontal) direction of the observer is taken as Y-axis, where the leftward direction is defined as positive direction; the direction of the observer's visual axis is taken as Z-axis, where the direction toward the concave mirror from the observer's eyeball is defined as positive direction; and the vertical direction of the observer is taken as X-axis, where the downward direction is defined as positive direction. In the figure, reference numeral 1 denotes a two-dimensional image display element, e.g., a LCD type element, 2 a first lens unit of a relay optical system, 3 a second lens unit of the relay optical system, 4 an ocular optical system formed from an aspherical concave mirror, 5 the observer's iris or eyeball rolling position, and 6 the visual axis lying when the observer sees forward.

Constituent parameters of the optical system will be shown below. It should be noted that the surface Nos. are shown as ordinal numbers in backward tracing from the position of the exit pupil 5 toward the two-dimensional image display element 1.

As to the decentration and the tilt angle, the concave mirror 4 is given a decentration only, which is a distance by which the vertex of the concave mirror 4 decenters in the Y-axis direction from the visual axis (Z-axis) passing through the center of the exit pupil 5. The relay optical system is given both a decentration and a tilt. First, a point of decentration in the Y-axis direction from the center of the exit pupil 5 is given, and an optical axis is determined so as to pass through the point of decentation. The tilt of the optical axis is given as an angle of tilt with respect to the positive direction of the Z-axis with the angle of rotation from the axis of the positive direction of the Z-axis toward the axis of the positive direction of the Y-axis defined as angle in the positive direction. Then, the position ($d_0$) of the vertex of the first surface (surface No. 3) of the relay optical system is given as a distance from the above-described point of decentration on the optical axis. The image surface (the two-dimensional image display element 1) is given both a decentration as a distance by which the center thereof shifts in a direction perpendicular to the optical axis of the relay optical system, and a tilt as an angle of tilt of the display surface thereof with respect to a plane perpendicular to the optical axis (for the tilt angle, the counterclockwise direction as viewed in the figure is defined as positive direction).

It is assumed that the curvature radius of the concave mirror 4 in the vertical direction (X-Z plane) is $R_x$, while that in the horizontal direction (Y-Z plane) is $R_y$.

Regarding the surface separation, the spacing between the exit pupil 5 and the concave mirror 4 is shown as a distance in the Z-axis direction between the center of the exit pupil 5 and the center of the concave mirror 4, and the spacing between the first surface of the relay optical system and the image surface thereof (the two-dimensional image display device 1) is shown as a distance along the optical axis. As to the relay optical system, the curvature radii of the surfaces are denoted by $r_1$ to $r_i$, the surface separations by $d_1$ to $d_i$, the refractive indices at D line by $n_1$ to $n_i$, and the Abbe's numbers by $\gamma_l$ to $\gamma_i$.

| Surface No. | Curvature radius | | Separation | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 | | | | |
| | $R_x$ −41.16135 | | | | |
| 1 (5) | ∞ (pupil) | | | −48.278991 | 26.040241° |
| | | ($d_0$) | 19.015438 | | |
| 3 ($r_1$) | −58.04366 | ($d_1$) | −1.000000 | $n_1$ = 1.75520 | $\nu_1$ = 27.5 |
| 4 ($r_2$) | −19.02574 | ($d_2$) | −38.720647 | | |
| 5 ($r_3$) | 12080.52179 | ($d_3$) | −1.000000 | $n_2$ = 1.48749 | $\nu_2$ = 70.2 |
| 6 ($r_4$) | −11.19630 | ($d_4$) | −1.522859 | | |
| 7 ($r_5$) | −21.28936 | ($d_5$) | −1.000000 | $n_3$ = 1.67270 | $\nu_3$ = 32.1 |
| 8 ($r_6$) | −10.10267 | ($d_6$) | −2.372624 | $n_4$ = 1.74400 | $\nu_4$ = 44.8 |
| 9 ($r_7$) | 23.76406 | ($d_7$) | −11.463429 | | |
| 10 ($r_8$) | 256.74720 | ($d_8$) | −1.000000 | $n_5$ = 1.75520 | $\nu_5$ = 27.5 |
| 11 ($r_9$) | −18.89849 | ($d_9$) | −4.518314 | $n_6$ = 1.48749 | $\nu_6$ = 70.2 |

-continued

| Surface No. | Curvature radius | Separation | | Decentration (refractive index) | Tilt angle (Abbe's number) |
|---|---|---|---|---|---|
| | 17 | | | | |
| 12 ($r_{10}$) | 14.81502 | ($d_{10}$) | −16.623492 | | |
| 13 ($r_{11}$) | −22.49878 | ($d_{11}$) | −9.004510 | $n_7 = 1.55232$ | $v_7 = 63.7$ |
| 14 ($r_{12}$) | 15.87987 | ($d_{12}$) | −1.000000 | $n_8 = 1.75520$ | $v_8 = 27.5$ |
| 15 ($r_{13}$) | ∞ | ($d_{13}$) | −5.000000 | −6.120974 | 1.969615° |
| 16 (1) | ∞ (image surface) | | | | |

The focal lengths $F_1$ and $F_2$ of the relay optical system in the above-described embodiment are as follows:

$F_1 = 23.261$, and $F_2 = -37.895$.

FIGS. 13(a) to 13(f) graphically show lateral aberrations at D line in the above-described embodiment. FIGS. 13(f) to 13(a) in the figure show values of lateral aberrations in the Y- and X-axis directions at various viewing angles: FIG. 13(f) shows lateral aberrations in the direction of the visual axis; FIG. 13(e) at 0° in the X-direction and −60° in the Y-direction; FIG. 13(d) at 40° in the X-direction and −60° in the Y-direction; FIG. 13 (c) at 40° in the X-direction and 0° in the Y-direction; FIG. 13(b) at 40° in the X-direction and 40° in the Y-direction; and FIG. 13(a) at 0° in the X-direction and 40° in the Y-direction. The embodiment shows similar aberration characteristics at other wavelengths, and chromatic aberration gives rise to no particular problem. The same is the case with other embodiments described below.

Embodiment 2

Figure 5:
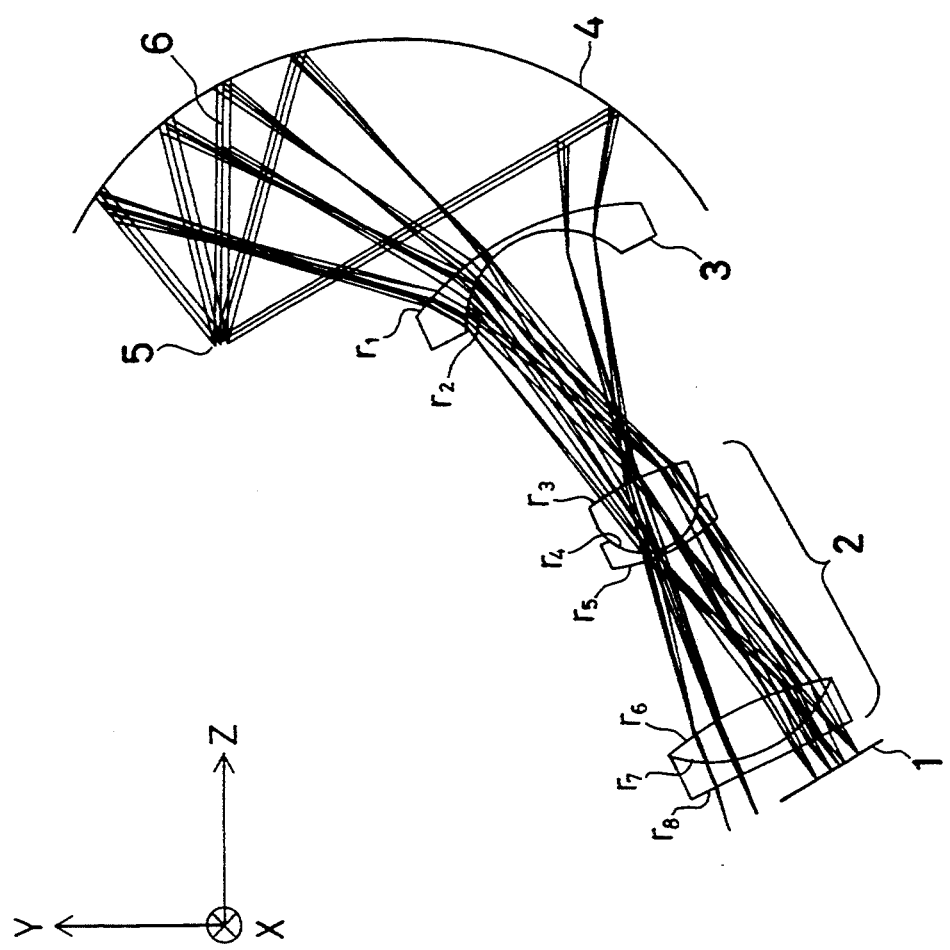
FIG. 5 shows the optical arrangement of embodiment 2 of the present invention.

The embodiment 2 will be explained below with reference to FIG. 5. The arrangement of the optical system is approximately the same as in the embodiment 1. The embodiment 2 is also the same as the embodiment 1 in the way of defining a coordinate system, the way of giving a decentration and/or a tilt, and the way of giving a curvature radius, surface separation, refractive index and Abbe's number for each surface. Constituent parameters of the optical system in this embodiment will be shown below. It should be noted that the surface Nos. are shown as ordinal numbers in backward tracing from the position of the exit pupil 5 toward the two-dimensional image display element 1.

| Surface No. | Curvature radius | Separation | | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 | | | | |
| | $R_x$ −41.16135 | | | | |
| 1 (5) | ∞ (pupil) | | | −48.278991 | 26.040241° |
| | | ($d_0$) | 16.665453 | | |
| 3 ($r_1$) | −37.55237 | ($d_1$) | −1.000000 | $n_1 = 1.61700$ | $v_1 = 62.8$ |
| 4 ($r_2$) | −12.85542 | ($d_2$) | −36.493414 | | |
| 5 ($r_3$) | −32.59437 | ($d_3$) | −10.162469 | $n_2 = 1.72000$ | $v_2 = 42.0$ |
| 6 ($r_4$) | 7.56580 | ($d_4$) | −1.000000 | $n_3 = 1.80518$ | $v_3 = 25.4$ |
| 7 ($r_5$) | 21.00741 | ($d_5$) | −23.043310 | | |
| 8 ($r_6$) | −38.95425 | ($d_6$) | −7.146229 | $n_4 = 1.70000$ | $v_4 = 48.1$ |
| 9 ($r_7$) | 16.25715 | ($d_7$) | −1.000000 | $n_5 = 1.80518$ | $v_5 = 25.4$ |
| 10 ($r_8$) | 42069.03894 | ($d_8$) | −5.000000 | −6.534836 | 4.811224° |
| 11 (1) | ∞ (image surface) | | | | |

The focal lengths $F_1$ and $F_2$ of the relay optical system in the above-described embodiment are as follows:

$F_1 = 22.522$, and $F_2 = -32.178$.

FIGS. 14(a) to 14(f) graphically show lateral aberrations at D line in the above-described embodiment in the same way as in the embodiment 1.

Figure 6:
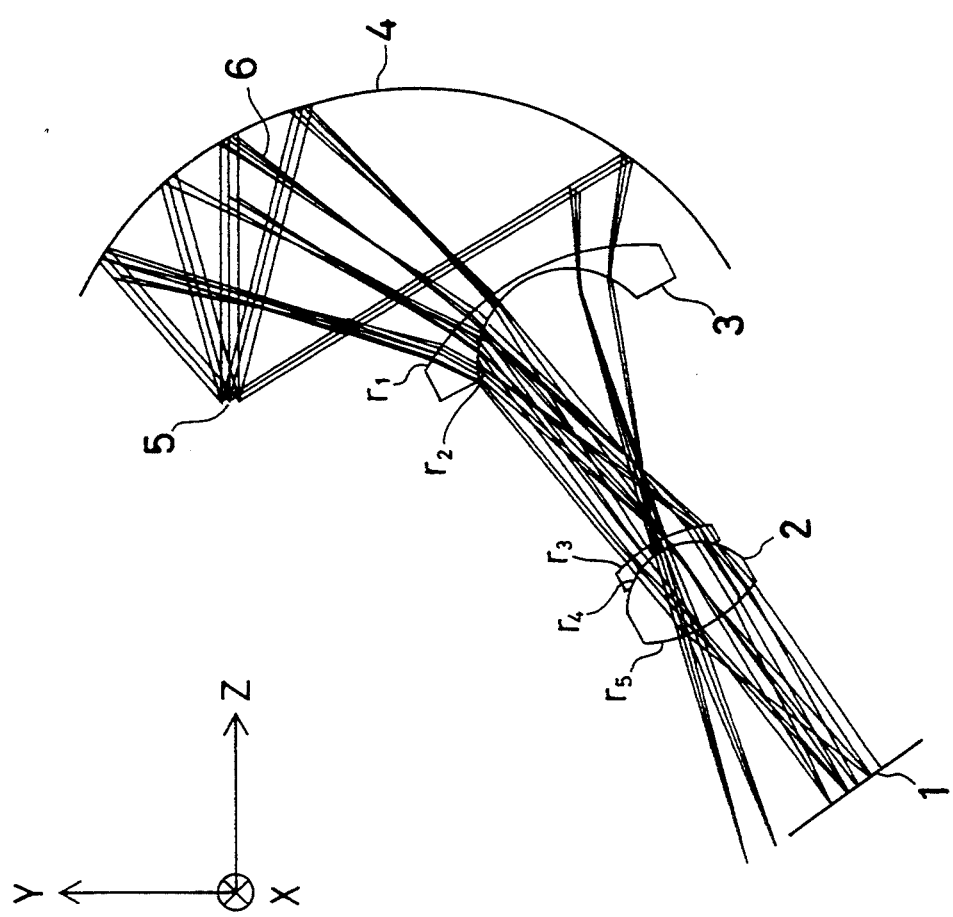
FIG. 6 shows the optical arrangement of embodiment 3 of the present invention.

Embodiment 3:

The embodiment 3 will be explained below with reference to FIG. 6. In this embodiment, the first lens unit 2 in the relay system is formed from only one lens comprising two lens elements cemented together. The embodiment 3 is the same as the embodiment 1 in the way of defining a coordinate system, the way of giving a decentration and/or a tilt, and the way of giving a curvature radius, surface separation, refractive index and Abbe's number for each surface. Constituent parameters of the optical system in this embodiment will be shown below. It should be noted that the surface Nos. are shown as ordinal numbers in backward tracing from the position of the exit pupil 5 toward the two-dimensional image display element 1.

| Surface No. | Curvature radius | Separation | | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 | | | | |
| | $R_x$ −41.16135 | | | | |
| 1 (5) | ∞ (pupil) | | | −48.278991 | 26.040241° |
| | | ($d_0$) | 18.191883 | | |
| 3 ($r_1$) | −31.96335 | ($d_1$) | −1.000000 | $n_1 = 1.61800$ | $v_1 = 63.4$ |
| 4 ($r_2$) | −12.76592 | ($d_2$) | −39.130088 | | |
| 5 ($r_3$) | −17.94522 | ($d_3$) | −1.000000 | $n_2 = 1.80518$ | $v_2 = 25.4$ |

-continued

| Surface No. | Curvature radius | | Separation | Decentration (refractive index) | Tilt angle (Abbe's number) |
|---|---|---|---|---|---|
| 6 ($r_4$) | −8.39187 | ($d_4$) | −12.000000 | $n_3 = 1.618366$ | $v_3 = 60.4$ |
| 7 ($r_5$) | 20.20347 | ($d_5$) | −28.911113 | −6.597812 | 7.853774° |
| 11 (I) | ∞ (image surface) | | | | |

The focal lengths $F_1$ and $F_2$ of the relay optical system in the above-described embodiment are as follows:

$F_1 = 20.942$, and $F_2 = -35.091$.

FIGS. 15(a) to 15(f) graphically show lateral aberrations at D line in the above-described embodiment in the same way as in the embodiment 1.

Embodiment 4

Figure 7:
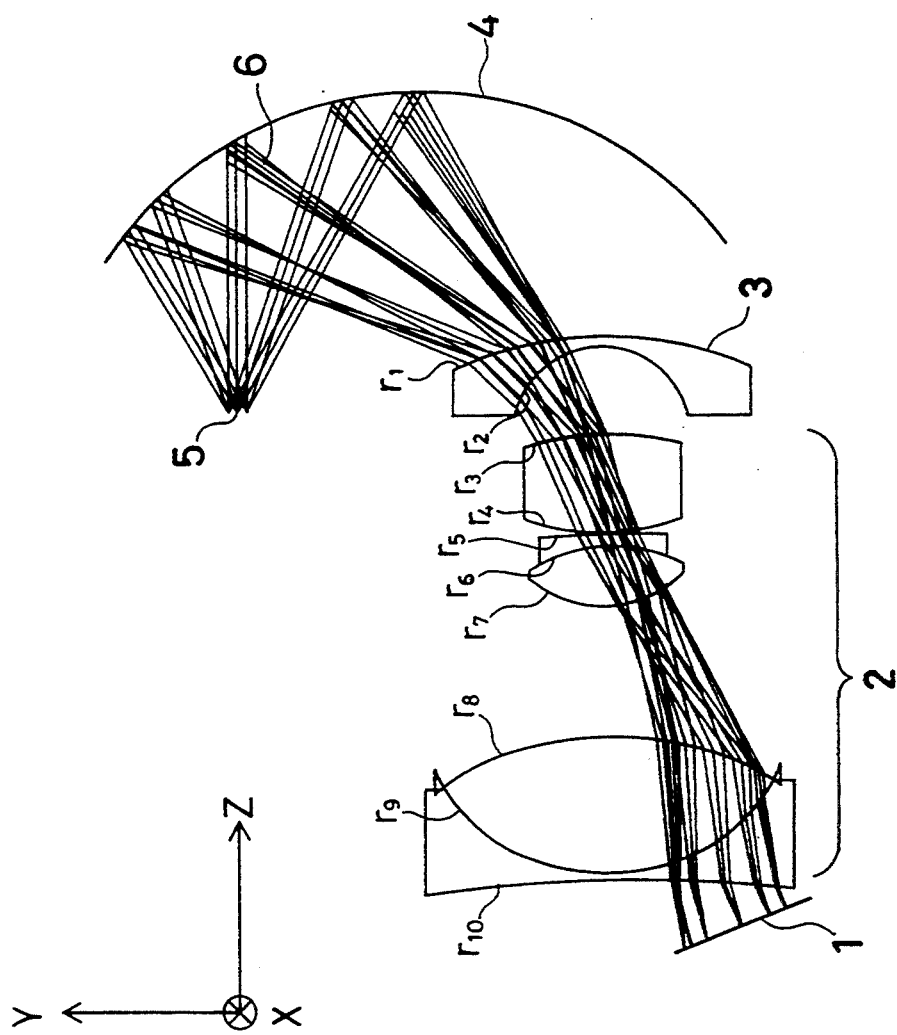
FIG. 7 shows the optical arrangement of embodiment 4 of the present invention.

The embodiment 4 will be explained below with reference to FIG. 7. The arrangement of the optical system is approximately the same as in the embodiment 1. The embodiment 4 is also the same as the embodiment 1 in the way of defining a coordinate system, the way of giving a decentration and/or a tilt, and the way of giving a curvature radius, surface separation, refractive index and Abbe's number for each surface. Constituent parameters of the optical system in this embodiment will be shown below. It should be noted that the surface Nos. are shown as ordinal numbers in backward tracing from the position of the exit pupil 5 toward the two-dimensional image display element 1.

The focal lengths $F_1$ and $F_2$ of the relay optical system in the above-described embodiment are as follows:

$F_1 = 18.727$, and $F_2 = -26.741$.

FIGS. 16(a) to 16(f) graphically show lateral aberrations at D line in the above-described embodiment in the same way as in the embodiment 1.

Embodiment 5

Figure 8:
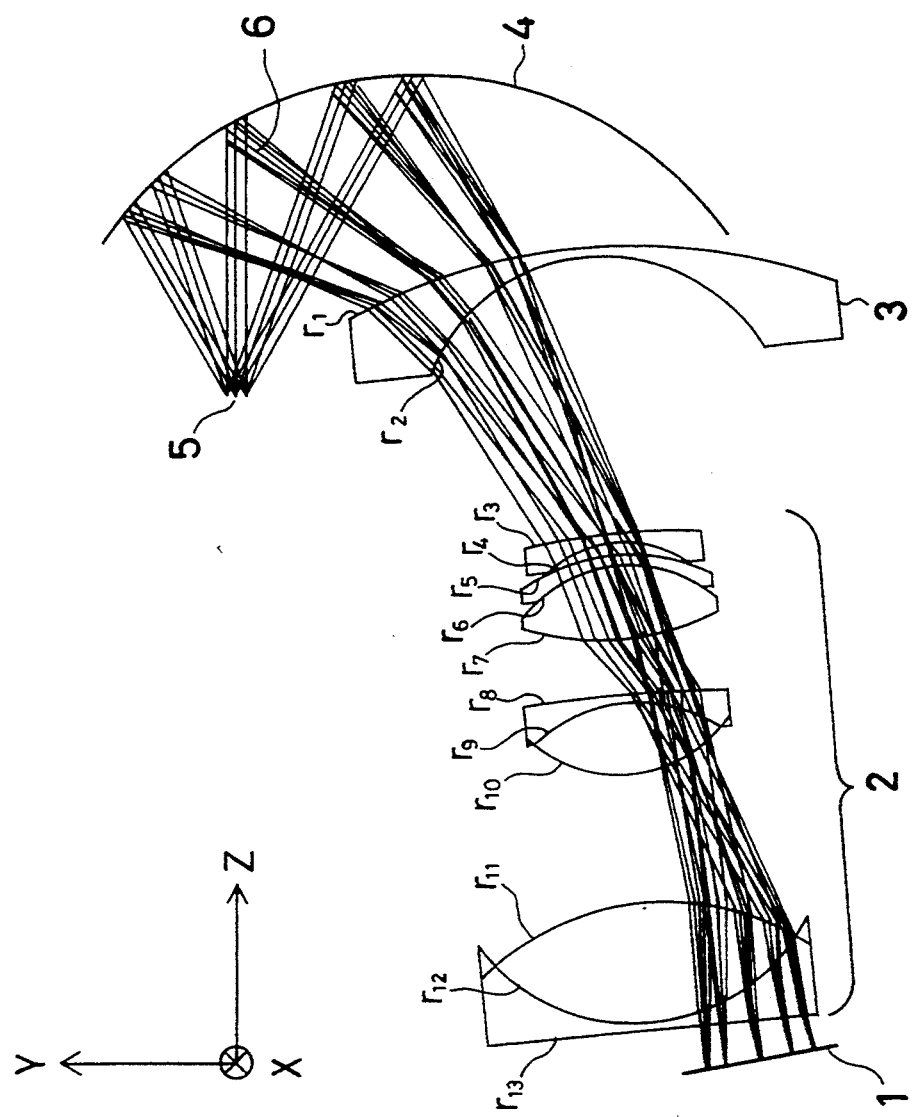
FIG. 8 shows the optical arrangement of embodiment 5 of the present invention.

The embodiment 5 will be explained below with reference to FIG. 8. The arrangement of the optical system is approximately the same as in the embodiment 1. The embodiment 5 is also the same as the embodiment 1 in the way of defining a coordinate system, the way of giving a decentration and/or a tilt, and the way of giving a curvature radius, surface separation, refractive index and Abbe's number for each surface. Constituent parameters of the optical system in this embodiment will be shown below. It should be noted that the surface Nos. are shown as ordinal numbers in backward tracing from the position of the exit pupil 5 toward the two-dimensional image display element 1.

| Surface No. | Curvature radius | | Separation | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 $R_x$ −41.16135 | | | | |
| 1 (5) | ∞ (pupil) | | | −48.278991 | −0.178099° |
| | | ($d_0$) | 9.100000 | | |
| 3 ($r_1$) | −45.52800 | ($d_1$) | −1.000000 | $n_1 = 1.56873$ | $v_1 = 63.1$ |
| 4 ($r_2$) | −11.30946 | ($d_2$) | −11.925756 | | |
| 5 ($r_3$) | −42.63346 | ($d_3$) | −12.888300 | $n_2 = 1.67270$ | $v_2 = 32.1$ |
| 6 ($r_4$) | 36.42143 | ($d_4$) | −0.100000 | | |
| 7 ($r_5$) | −242.44093 | ($d_5$) | −1.000000 | $n_3 = 1.75520$ | $v_3 = 27.5$ |
| 8 ($r_6$) | −16.63655 | ($d_6$) | −8.515946 | $n_4 = 1.50378$ | $v_4 = 66.8$ |
| 9 ($r_7$) | 13.87577 | ($d_7$) | −16.623492 | | |
| 10 ($r_8$) | −38.60163 | ($d_8$) | −18.327962 | $n_5 = 1−64100$ | $v_5 = 56.9$ |
| 11 ($r_9$) | 26.22947 | ($d_9$) | −1.000000 | $n_6 = 1.80518$ | $v_6 = 25.4$ |
| 12 ($r_{10}$) | −204.53911 | ($d_{10}$) | −6.254814 | −17.080254 | 19.576288° |
| 13 (I) | ∞ (image surface) | | | | |

| Surface No. | Curvature radius | | Separation | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 $R_x$ −41.16135 | | | | |
| 1 (5) | ∞ (pupil) | | | −48.278991 | 4.057623° |
| | | ($d_0$) | 19.015438 | | |
| 3 ($r_1$) | −80.99141 | ($d_1$) | −1.000000 | $n_1 = 1.75520$ | $v_1 = 27.5$ |
| 4 ($r_2$) | −24.92726 | ($d_2$) | −36.586270 | | |
| 5 ($r_3$) | −70.69727 | ($d_3$) | −1.000000 | $n_2 = 1.48749$ | $v_2 = 70.2$ |
| 6 ($r_4$) | −13.98134 | ($d_4$) | −1.715769 | | |
| 7 ($r_5$) | −25.50551 | ($d_5$) | −1.000000 | $n_3 = 1.67270$ | $v_3 = 32.1$ |
| 8 ($r_6$) | −16.52040 | ($d_6$) | −10.406194 | $n_4 = 1.74400$ | $v_4 = 44.8$ |
| 9 ($r_7$) | 33.01851 | ($d_7$) | −7.389077 | | |
| 10 ($r_8$) | −403.63217 | ($d_8$) | −1.000000 | $n_5 = 1.75520$ | $v_5 = 27.5$ |
| 11 ($r_9$) | −20.12047 | ($d_9$) | −9.088408 | $n_6 = 1.48749$ | $v_6 = 70.2$ |
| 12 ($r_{10}$) | 17.91058 | ($d_{10}$) | −16.623492 | | |
| 13 ($r_{11}$) | −33.65736 | ($d_{11}$) | −16.000000 | $n_7 = 1.55232$ | $v_7 = 63.7$ |
| 14 ($r_{12}$) | 26.63178 | ($d_{12}$) | −1.000000 | $n_8 = 1.75520$ | $v_8 = 27.5$ |

-continued

| Surface No. | Curvature radius | | Separation | Decentration (refractive index) | Tilt angle (Abbe's number) |
|---|---|---|---|---|---|
| 15 ($r_{13}$) | ∞ | ($d_{13}$) | −5.000000 | −13.623207 | 4.719896° |
| 16 (1) | ∞ (image surface) | | | | |

The focal lengths $F_1$ and $F_2$ of the relay optical system in the above-described embodiment are as follows:

$F_1 = 24.682$, and $F_2 = -48.052$.

FIGS. 17(a) to 17(f) graphically show lateral aberrations at D line in the above-described embodiment in the same way as in the embodiment 1.

Embodiment 6

Figure 9:
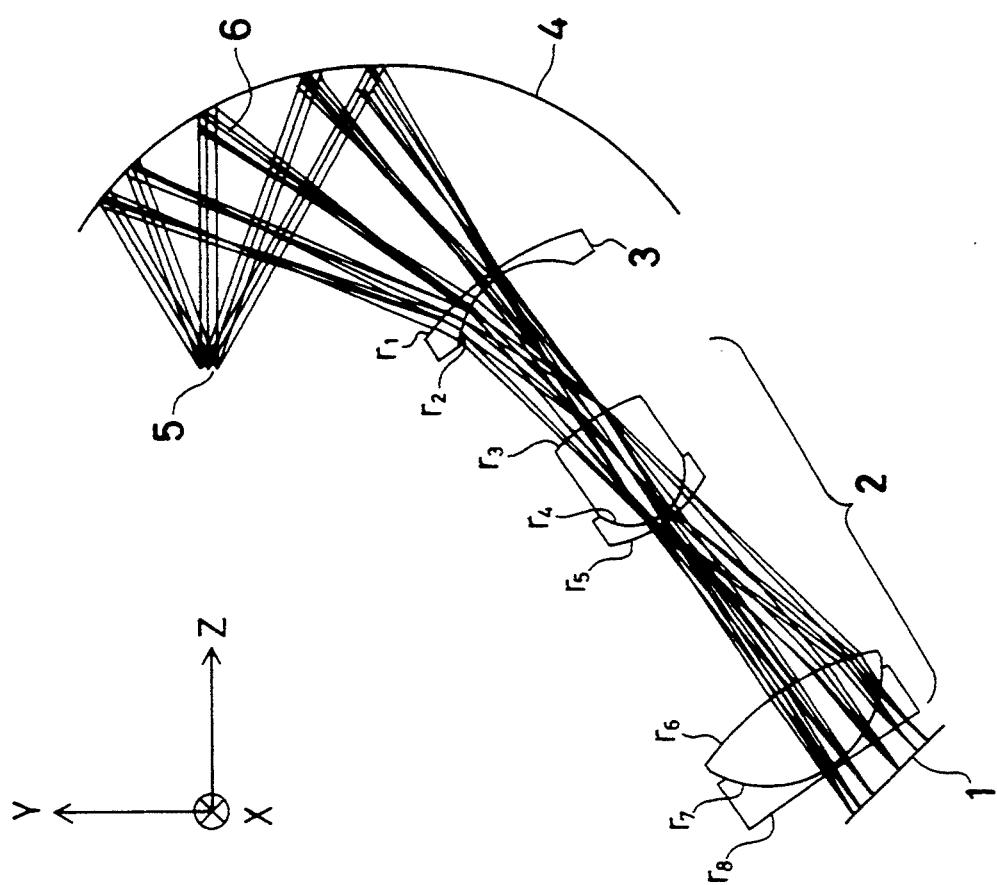
FIG. 9 shows the optical arrangement of embodiment 6 of the present invention.

The embodiment 6 will be explained below with reference to FIG. 9. The arrangement of the optical system is approximately the same as in the embodiment 1. The embodiment 6 is also the same as the embodiment 1 in the way of defining a coordinate system, the way of giving a decentration and/or a tilt, and the way of giving a curvature radius, surface separation, refractive index and Abbe's number for each surface. Constituent parameters of the optical system in this embodiment will be shown below. It should be noted that the surface Nos. are shown as ordinal numbers in backward tracing from the position of the exit pupil 5 toward the two-dimensional image display element 1.

FIGS. 18(a) to 18(f) graphically show lateral aberrations at D line in the above-described embodiment in the same way as in the embodiment 1.

Embodiment 7

Figure 10:
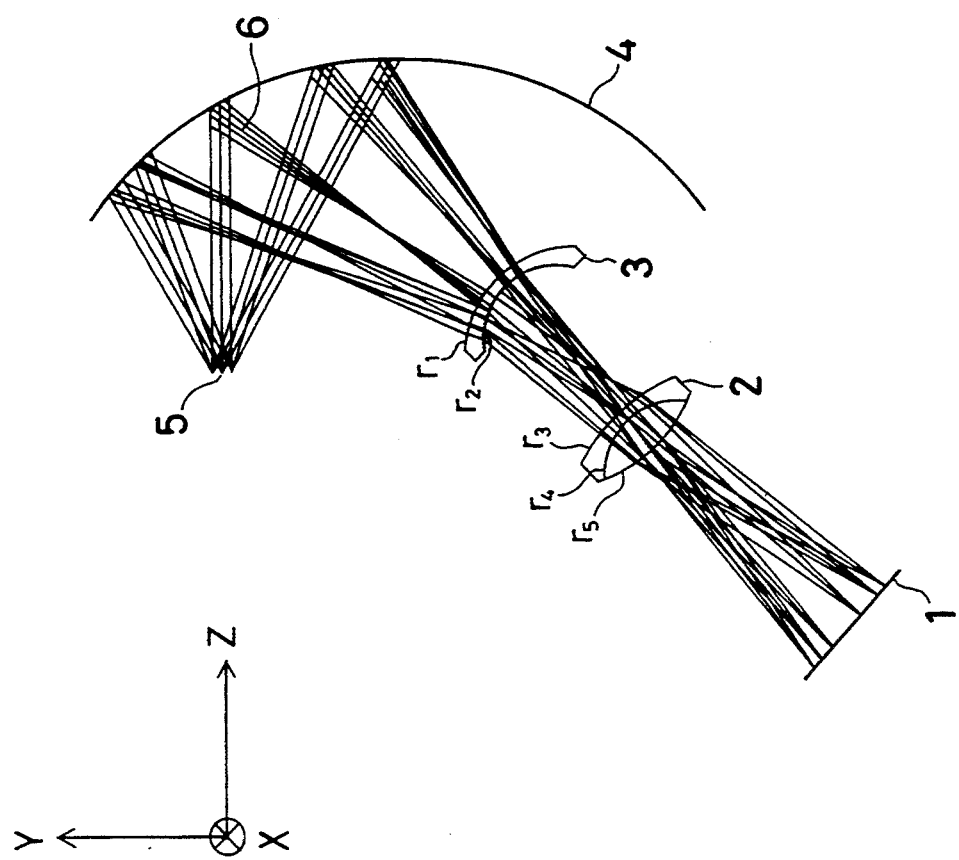
FIG. 10 shows the optical arrangement of embodiment 7 of the present invention.

The embodiment 7 will be explained below with reference to FIG. 10. The arrangement of the optical system is approximately the same as in the embodiment 3. The embodiment 7 is the same as the embodiment 1 in the way of defining a coordinate system, the way of giving a decentration and/or a tilt, and the way of giving a curvature radius, surface separation, refractive index and Abbe's number for each surface. Constituent parameters of the optical system in this embodiment will be shown below. It should be noted that the surface Nos. are shown as ordinal numbers in backward tracing from the position of the exit pupil 5 toward the two-dimensional image display element 1.

| Surface No. | Curvature radius | | Separation | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 $R_x$ −41.16135 | | | | |
| 1 (5) | ∞ (pupil) | | | −48.278991 | 40.420411° |
| | | ($d_0$) | 15.657649 | | |
| 3 ($r_1$) | −13.57224 | ($d_1$) | −1.000000 | $n_1 = 1.61800$ | $\nu_1 = 63.4$ |
| 4 ($r_2$) | −8.43996 | ($d_2$) | −23.230568 | | |
| 5 ($r_3$) | −24.49654 | ($d_3$) | −1.000000 | $n_2 = 1-80518$ | $\nu_2 = 25.4$ |
| 6 ($r_4$) | −8.57513 | ($d_4$) | −5.797191 | $n_3 = 1.66989$ | $\nu_3 = 51.1$ |
| 7 ($r_5$) | 17.69302 | ($d_5$) | −34.959813 | −4.965890 | 7.213139° |
| 11 (1) | ∞ (image surface) | | | | |

The focal lengths $F_1$ and $F_2$ of the relay optical System in the above-described embodiment are as follows:

$F_1 = 19.133$, and $F_2 = -39.019$.

| Surface No. | Curvature radius | | Separation | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 $R_x$ −41.16135 | | | | |
| 1 (5) | ∞ (pupil) | | | −48.278991 | 32.978130° |
| | | ($d_0$) | 15.127157 | | |
| 3 ($r_1$) | −37.55237 | ($d_1$) | −1.000000 | $n_1 = 1.61700$ | $\nu_1 = 62.8$ |
| 4 ($r_2$) | −12.85542 | ($d_2$) | −23.627240 | | |
| 5 ($r_3$) | −32.59437 | ($d_3$) | −16.000000 | $n_2 = 1.72000$ | $\nu_2 = 42.0$ |
| 6 ($r_4$) | 7.56580 | ($d_4$) | −1.000000 | $n_3 = 1.80518$ | $\nu_3 = 25.4$ |
| 7 ($r_5$) | 21.00741 | ($d_5$) | −28.495921 | | |
| 8 ($r_6$) | −38.95425 | ($d_6$) | −11.862373 | $n_4 = 1.70000$ | $\nu_4 = 48.1$ |
| 9 ($r_7$) | 16.25715 | ($d_7$) | −1.000000 | $n_5 = 1.80518$ | $\nu_5 = 25.4$ |
| 10 ($r_8$) | 42069.03894 | ($d_8$) | −5.000000 | −7.333641 | 10.995778° |
| 11 (1) | ∞ (image surface) | | | | |

The focal lengths $F_1$ and $F_2$ of the relay optical system in the above-described embodiment are as follows:

$F_1 = 25.154$, and $F_2 = -32.178$.

FIGS. 19(a) to 19(f) graphically show lateral aberrations at D line in the above-described embodiment in the same way as in the embodiment 1.

Embodiment 8

Figure 11:
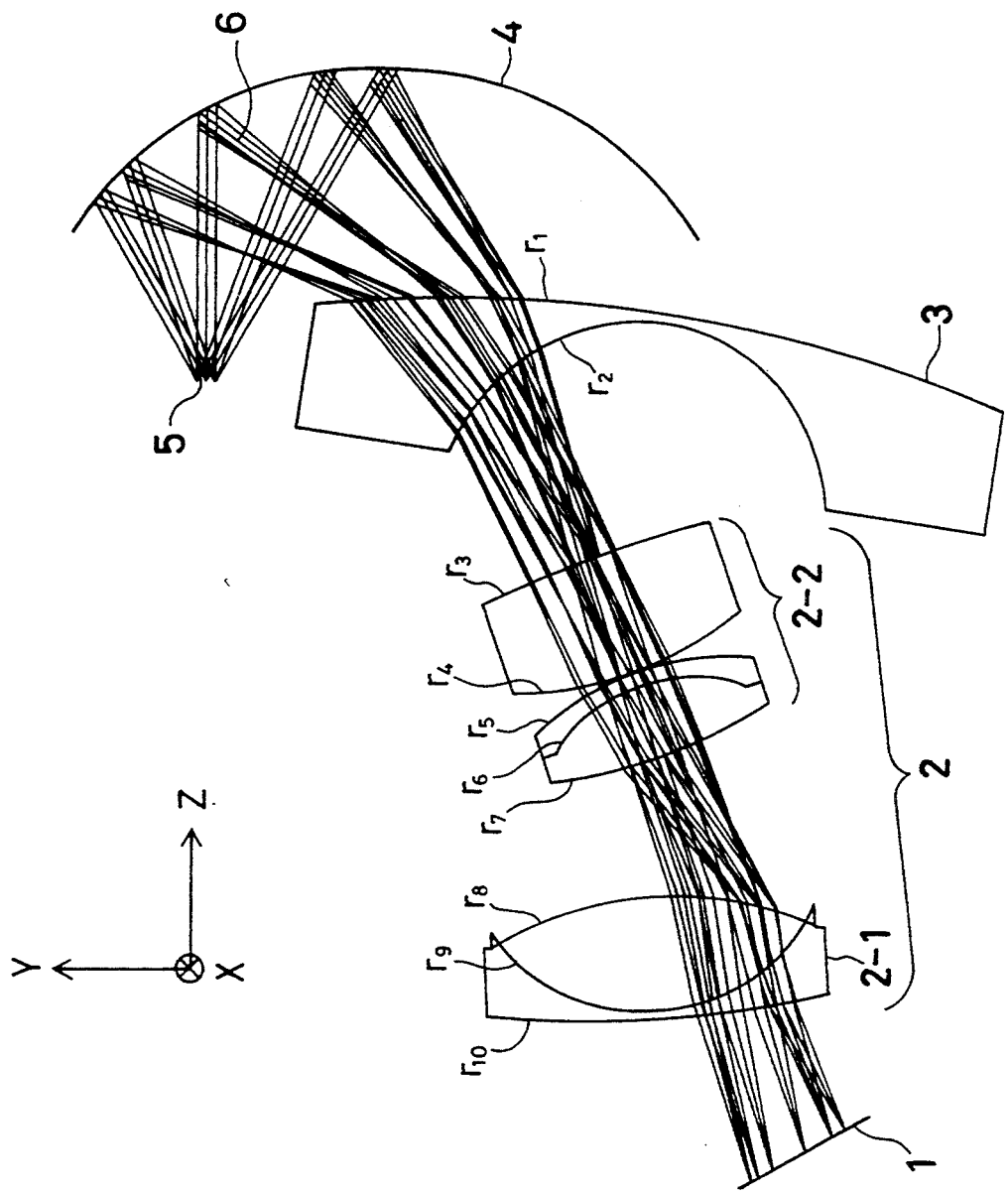
FIG. 11 shows the optical arrangement of embodiment 8 of the present invention.

The embodiment 8 will be explained with reference to FIG. 11. In this embodiment, the way of defining a coordinate system is the same as in the embodiment 1. In this case, the first lens unit 2 of the relay optical system comprises a first part 2-1 and a second part 2-2.

Constituent parameters of the optical system will be shown below. It should be noted that the surface Nos. are shown as ordinal numbers in backward tracing from the position of the exit pupil 5 toward the two-dimensional image display element 1.

As to the decentration and the tilt, the concave mirror 4 is given a decentration in the same way as in the embodiment 1, and the second lens unit 3 of the relay optical system is also given a decentration and a tilt in the same way as in the embodiment 1. Regarding the first part 2-1 of the first lens unit 2 in the relay optical system, the decentration of the optical axis thereof is given as a distance by which it decenters in a direction perpendicular to the optical axis of the second lens unit 3 of the relay optical system, and the tilt of the optical axis is given as an angle of tilt with respect to the optical axis of the second lens unit 3 of the relay optical system. Similarly, the decentration of the second part 2-2 of the first lens unit 2 in the relay optical system is given as a distance by which it decenters in a direction perpendicular to the optical axis of the part 2-1, and the tilt of the optical axis is given as an angle of tilt with respect to the optical axis of the part 2-1. The image surface (the two-dimensional image display element 1) is given a decentration as a distance by which the center thereof shifts in a direction perpendicular to the optical axis of the part 2-2, and a tilt as an angle of tilt of the display surface thereof with respect to a plane perpendicular to the optical axis.

In addition, a curvature radius, surface separation, refractive index and Abbe's number are given for each surface in the same way as in the embodiment 1.

The focal lengths $F_1$ and $F_2$ of the relay optical system in the above-described embodiment are as follows:

$F_1 = 28.882$, and $F_2 = -61.710$.

FIG. 20 graphically shows lateral aberrations at D line in the above-described embodiment in the same way as in the embodiment 1.

Embodiment 9

Figure 12:
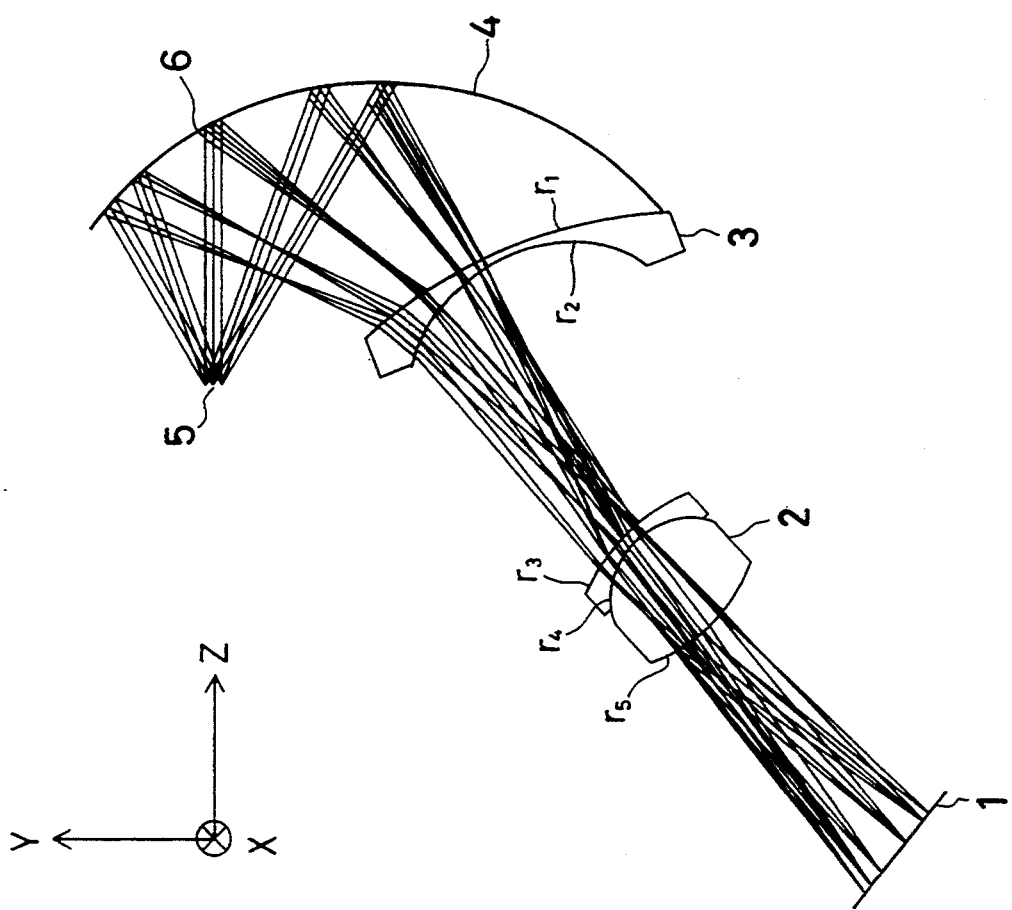
FIG. 12 shows the optical arrangement of embodiment 9 of the present invention.
Figure 15A:
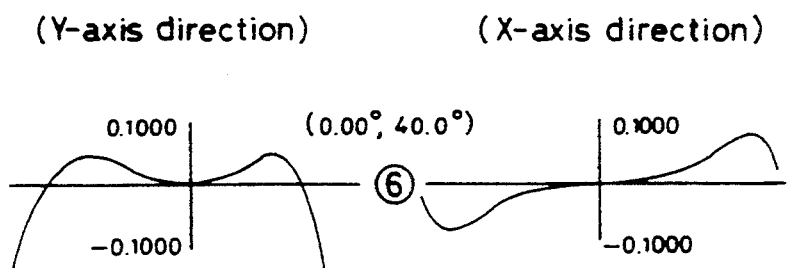
FIGS. 15(a) to 15(f) graphically show lateral aberrations in the embodiment 3 in the same way as in FIG. 13.
Figure 15B:
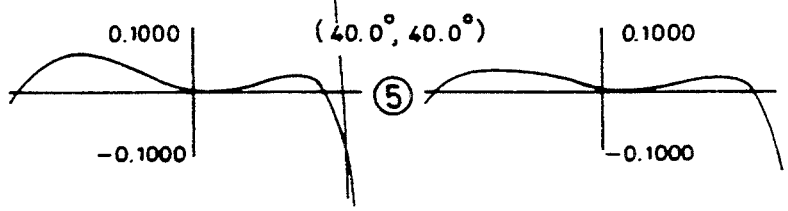
Figure 15C:
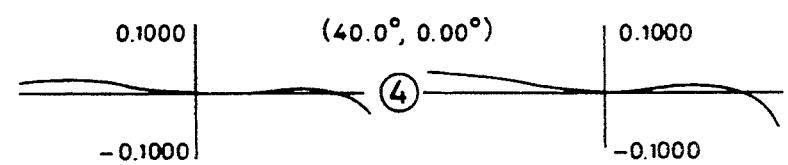
Figure 15D:
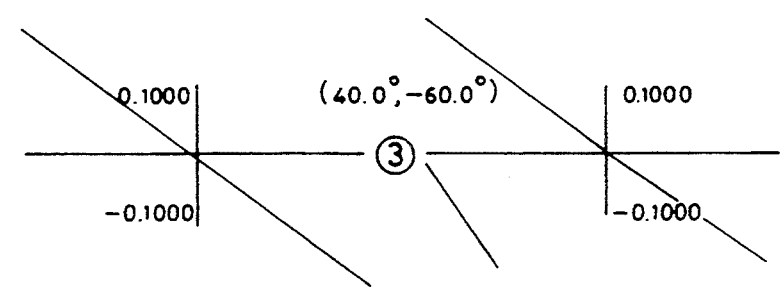
Figure 15E:
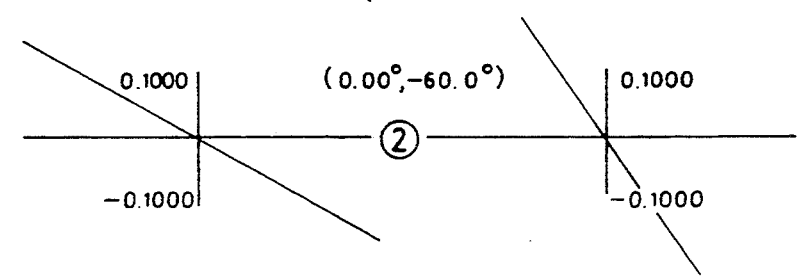
Figure 15F:
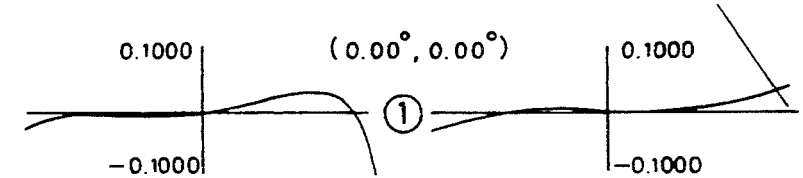
Figure 16A:
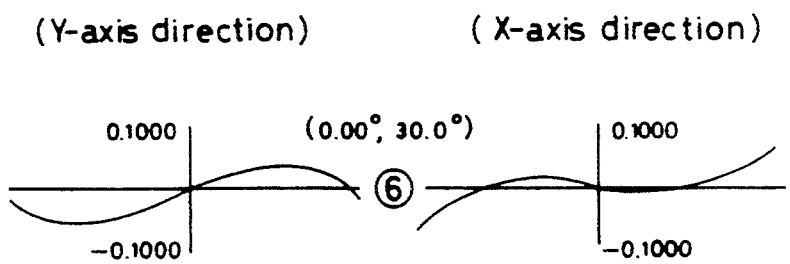
FIGS. 16(a) to 16(f) graphically show lateral aberrations in the embodiment 4 in the same way as in FIG. 13.
Figure 16B:
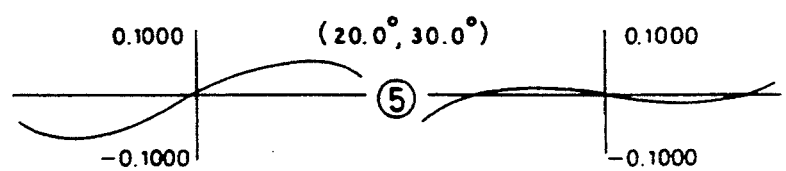
Figure 16C:
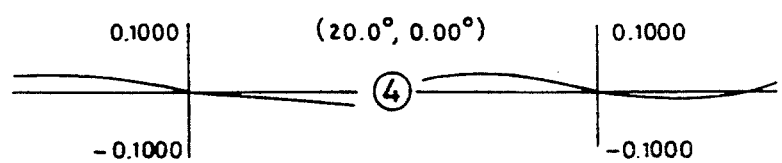
Figure 16D:
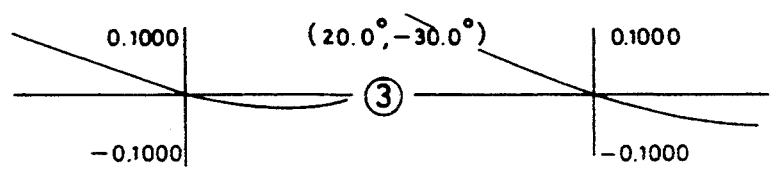
Figure 16E:
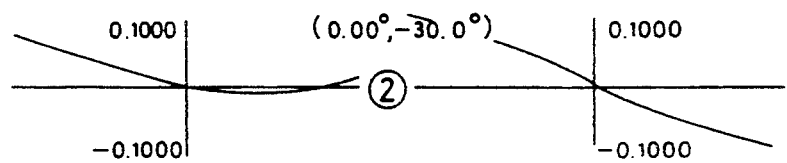
Figure 16F:
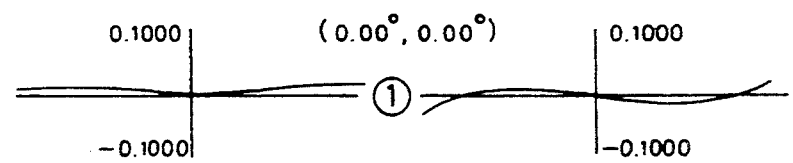
Figure 17A:
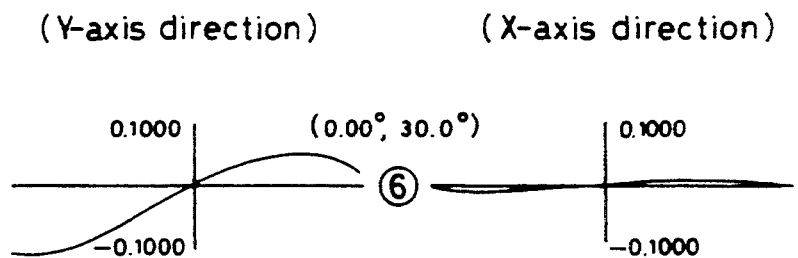
FIGS. 17(a) to 17(f) graphically show lateral aberrations in the embodiment 5 in the same way as in FIG. 13.
Figure 17B:
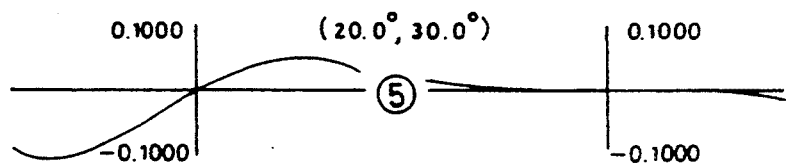
Figure 17C:
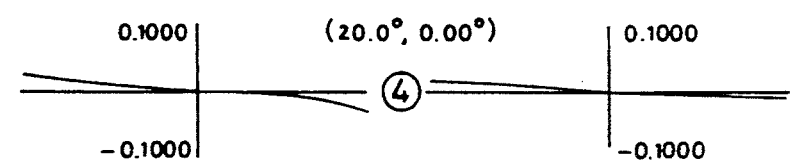
Figure 17D:
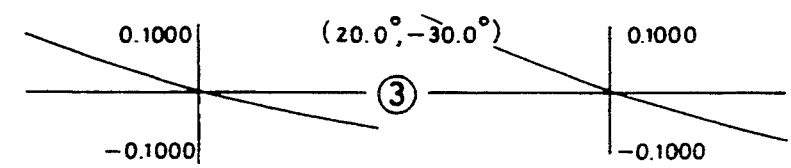
Figure 17E:
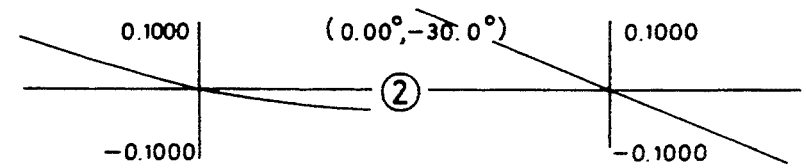
Figure 17F:
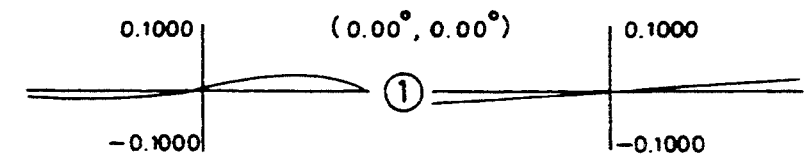
Figure 21A:
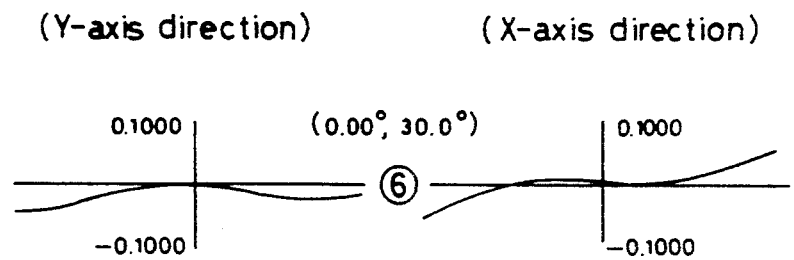
FIGS. 21(a) to 21(f) graphically show lateral aberrations in the embodiment 9 in the same way as in FIG. 13.
Figure 21B:
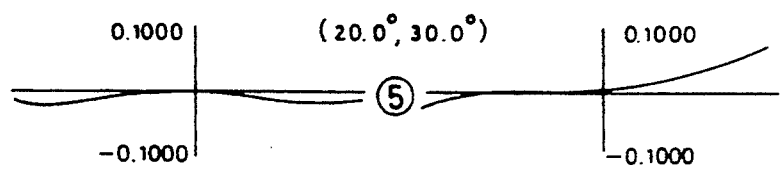
Figure 21C:
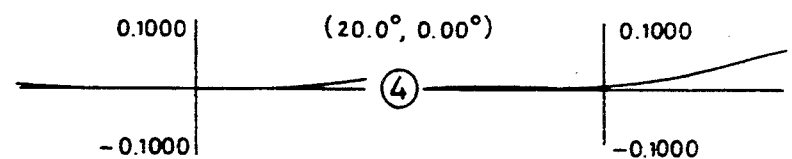
Figure 21D:
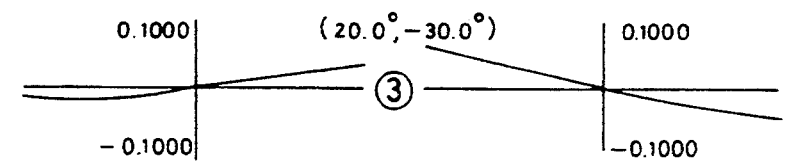
Figure 21E:
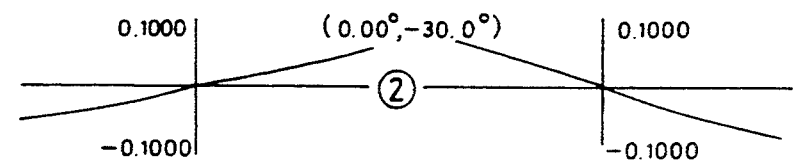
Figure 21F:
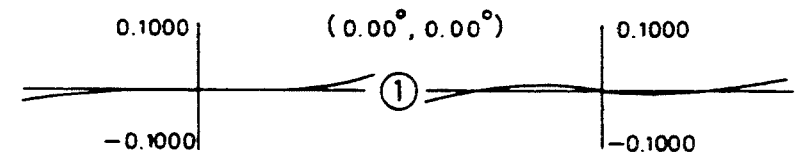
Figure 22A:
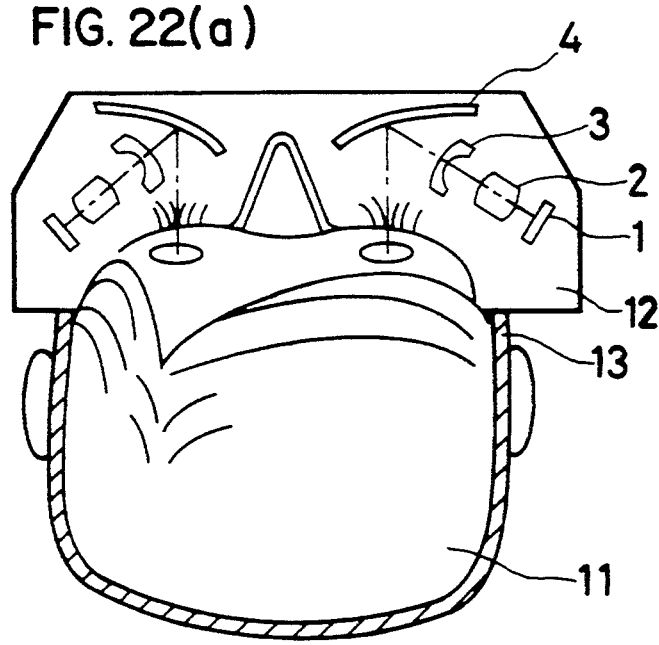
FIGS. 22(a) and 22(b) are views for explanation of a support device used when the visual display apparatus of the present invention is mounted on the observer's head.
Figure 22B:
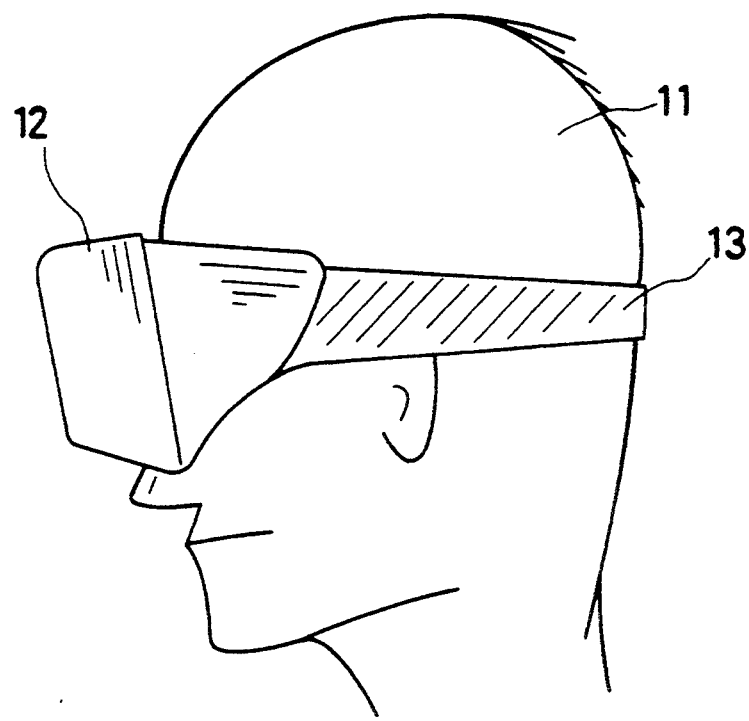
Figure 23:
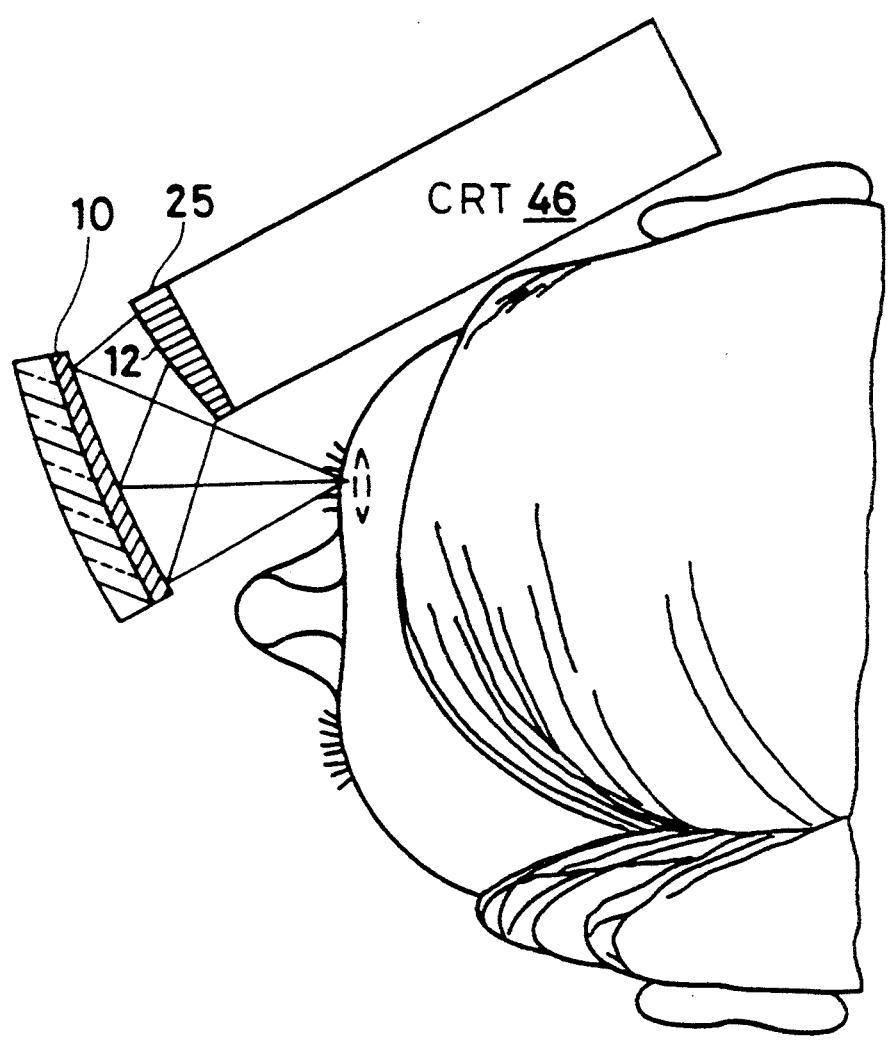
FIG. 23 is a plan view showing the arrangement of a conventional head-mounted display apparatus.
Figure 24:
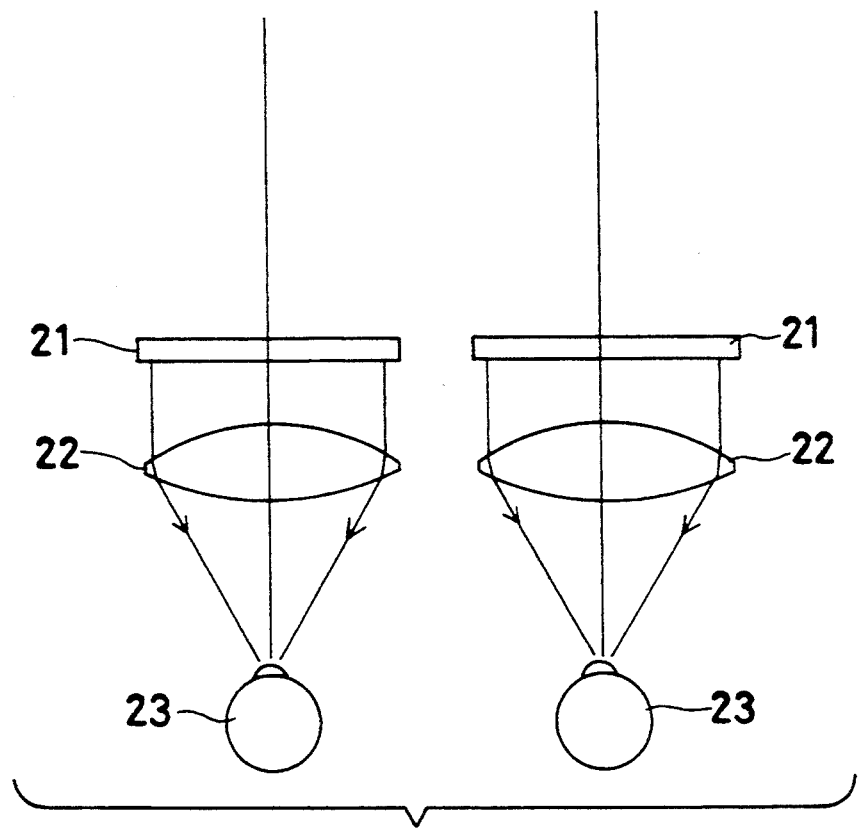
FIG. 24 is a plan view showing a conventional arrangement of a head-mounted display apparatus proposed by the present applicant.

The embodiment 9 will be explained with reference to FIG. 12. In this embodiment, the way of defining a coordinate system is the same as in the embodiment 1. In this case, the first lens unit 2 and the second lens unit 3 of the relay optical system are disposed in decentered relation to each other.

Constituent parameters of the optical system will be shown below. It should be noted that the surface Nos. are shown as ordinal numbers in backward tracing from the position of the exit pupil 5 toward the two-dimensional image display element 1.

As to the decentration and the tilt, the concave mirror 4 is given a decentration in the same way as in the embodiment 1, and the center axis thereof is given a tilt with respect to the Z-axis. Further, the second lens unit 3 of the relay optical system is also given a decentration and a tilt in the same way as in the embodiment 1. Regarding the first lens unit 2 in the relay optical system, the decentration of the optical axis thereof is given as a distance by which it decenters in a direction perpendicular to the optical axis of the second lens unit 3 of the relay optical system, and the tilt of the optical axis is given as an angle of tilt with respect to the optical axis of the second lens unit 3. The image surface (the two-dimensional image display element 1) is given a decentration as a distance by which the center thereof shifts in a direction perpendicular to the optical axis of the first lens unit 2, and a tilt as an angle of tilt of the display surface thereof with respect to a plane perpendicular to the optical axis.

In addition, a curvature radius, surface separation, refractive index and Abbe's number are given for each surface in the same way as in the embodiment 1.

| Surface No. | Curvature radius | | Separation | Decentration (refractive index) | Tilt angle (Abbe's number) |
|---|---|---|---|---|---|
| 1 (5) | ∞ (pupil) | (D) | 41.161349 | −24.134707 | |
| 2 (4) | $R_y$ −55.37625 | | | | |
| | $R_x$ −41.16135 | | | | |
| 1 (5) | ∞ (pupil) | | | −59.732980 | −8.791123° |
| | | ($d_0$) | 9.100000 | | |
| 3 ($r_1$) | −191.82408 | ($d_1$) | −1.000000 | $n_1 = 1.48749$ | $\nu_1 = 70.2$ |
| 4 ($r_2$) | −25.96046 | ($d_2$) | −32.498922 | 4.072822 | 28.747190° |
| 5 ($r_3$) | −209.06385 | ($d_3$) | −16.000000 | $n_2 = 1.64100$ | $\nu_2 = 56.9$ |
| 6 ($r_4$) | 59.77712 | ($d_4$) | −0.100000 | | |
| 7 ($r_5$) | −39.79811 | ($d_5$) | −2.000000 | $n_3 = 1.80518$ | $\nu_3 = 25.4$ |
| 8 ($r_6$) | −21.02007 | ($d_6$) | −9.742240 | $n_4 = 1.58913$ | $\nu_4 = 61.2$ |
| 9 ($r_7$) | 64.11810 | ($d_7$) | −16.623492 | 7.453844 | −16.220540° |
| 10 ($r_8$) | −44.68943 | ($d_8$) | −15.515796 | $n_5 = 1.62041$ | $\nu_5 = 60.3$ |
| 11 ($r_9$) | 26.49680 | ($d_9$) | −1.000000 | $n_6 = 1.80518$ | $\nu_6 = 25.4$ |
| 12 ($r_{10}$) | 178.46191 | ($d_{10}$) | −19.107691 | −17.958057 | 23.157995° |
| 13 (1) | ∞ (image surface) | | | | |

| Surface No. | Curvature radius | | Separation | Decentration (refractive index) | Tilt angle (Abbe's number) |
|---|---|---|---|---|---|
| 1 (5) | ∞ (pupil) | (D) | 41.161349 | −22.714867 | 0.960545° |
| 2 (4) | $R_y$ −55.37625 | | | | |
| | $R_x$ −41.16135 | | | | |
| 1 (5) | ∞ (pupil) | | | −48.278991 | 22.104374° |
| | | ($d_0$) | 19.900000 | | |
| 3 ($r_1$) | −73.00626 | ($d_1$) | −1.000000 | $n_1 = 1.61800$ | $\nu_1 = 63.4$ |
| 4 ($r_2$) | −21.33949 | ($d_2$) | −41.890561 | −1.016011 | 21.764664° |

-continued

| Surface No. | Curvature radius | | Separation | Decentration (refractive index) | Tilt angle (Abbe's number) |
|---|---|---|---|---|---|
| 5 ($r_3$) | −25.53817 | ($d_3$) | −1.000000 | $n_2 = 1.80518$ | $v_2 = 25.4$ |
| 6 ($r_4$) | −10.48972 | ($d_4$) | −16.000000 | $n_3 = 1.65560$ | $v_3 = 46.1$ |
| 7 ($r_5$) | 25.36542 | ($d_5$) | −40.478597 | 3.210122 | 8.273448° |
| 8 (I) | ∞ (image surface) | | | | |

The focal lengths $F_1$ and $F_2$ of the relay optical system in the above-described embodiment are as follows:

$F_1 = 25.949$, and $F_2 = -49.155$.

FIGS. 21(a) to 21(f) graphically show lateral aberrations at D line in the above-described embodiment in the same way as in the embodiment 1.

Although the visual display apparatus of the present invention has been described above by way of some embodiments, it should be noted here that the present invention is not necessarily limited to the described embodiments and that various changes and modifications may be imparted thereto.

As will be clear from the foregoing description, it is possible according to the present invention to provide a head-mounted display apparatus which projects only a little from the observer's head and has a compact structure and which enables observation at a wide field angle and provides an image which is clear as far as the peripheries thereof.

What we claimed is:

1. A head- or face-mounted display apparatus comprising:
   screen means for displaying an image;
   a relay optical system for relaying said image displayed by said screen means; and
   an ocular optical system disposable in front of an observer's eyeball to lead an optical path from said relay optical system to said observer's eyeball so that said image relayed by said relay optical system is projectable inside said observer's eyeball as an enlarged image;
   wherein said relay optical system includes:
   a first lens unit having at least one positive lens and having positive power as a whole; and
   a second lens unit having negative power;
   said first and second lens units being disposed in the mentioned order from said screen means side; and
   said relay optical system being disposed so that a lens center axis of at least said second lens unit is decentered with respect to a visual axis that is led from said ocular optical system to said screen means when said observer sees forward.

2. A head- or face-mounted display apparatus according to claim 1, wherein said first and second lens units are arranged so that said image relayed by said relay optical system lies in a vicinity of said second lens unit.

3. A head- or face-mounted display apparatus according to claim 1, wherein at least one lens in said first lens unit is decentered with respect to said visual axis that is led from said ocular optical system to said screen means when said observer sees forward.

4. A head- or face-mounted display apparatus according to claim 1 or 3, wherein said decentering is an axially parallel shift.

5. A head- or face-mounted display apparatus according to claim 1 or 3, wherein said decentering is a tilt.

6. A head- or face-mounted display apparatus according to claim 1, wherein a focal length $F_2$ of said second lens unit satisfies the following condition:

$|F_2| < 100$ millimeters.

7. A head- or face-mounted display apparatus according to claim 1, wherein a focal length $F_2$ of said second lens unit satisfies the following condition:

$|F_2| < 70$ millimeters.

8. A head- or face-mounted display apparatus according to claim 1, wherein a focal length $F_1$ of said first lens unit satisfies the following condition:

$|F_1| < 50$ millimeters.

9. A head- or face-mounted display apparatus according to claim 1, wherein a focal length $F_1$ of said first lens unit satisfies the following condition:

$|F_1| < 40$ millimeters.

10. A head- or face-mounted display apparatus according to claim 1, wherein a focal length FR of said ocular optical system and a distance D from said ocular optical system to an observer's iris satisfy the following conditions:

$D > 1.2 \times FR$ $D > 30$ millimeters.

11. A head- or face-mounted display apparatus according to claim 1, wherein a focal length FR of said ocular optical system and a distance D from said ocular optical system to an observer's eyeball rolling position satisfy the following conditions:

$D > 1.2 \times FR$ $D > 30$ millimeters.

* * * * *